United States Patent
Lu et al.

(10) Patent No.: US 10,211,958 B2
(45) Date of Patent: Feb. 19, 2019

(54) METHOD FOR TRANSMITTING UPLINK INFORMATION IN MULTI-USER MULTIPLE-INPUT MULTIPLE-OUTPUT SYSTEM, AND APPARATUS

(71) Applicant: HUAWEI TECHNOLOGIES CO., LTD., Shenzhen (CN)

(72) Inventors: Weishan Lu, Shenzhen (CN); Doron Ezri, Munich (DE); Le Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 15/417,970

(22) Filed: Jan. 27, 2017

(65) Prior Publication Data

US 2017/0141899 A1    May 18, 2017

Related U.S. Application Data

(63) Continuation of application No. PCT/CN2014/083771, filed on Aug. 6, 2014.

(51) Int. Cl.
*H04L 5/00*      (2006.01)
*H04B 7/0452*    (2017.01)
(Continued)

(52) U.S. Cl.
CPC ......... *H04L 5/0048* (2013.01); *H04B 7/0452* (2013.01); *H04L 5/0051* (2013.01);
(Continued)

(58) Field of Classification Search
CPC . H04L 5/0048; H04L 5/0051; H04L 25/0226; H04L 27/2613; H04L 27/22657;
(Continued)

(56) References Cited

U.S. PATENT DOCUMENTS

| | | | |
|---|---|---|---|
| 8,995,588 B2 * | 3/2015 | Kenney | H04B 1/14 375/344 |
| 9,130,815 B2 | 9/2015 | Weinholt et al. | |

(Continued)

FOREIGN PATENT DOCUMENTS

| | | |
|---|---|---|
| CN | 1677970 A | 10/2005 |
| CN | 101299737 | 11/2008 |

(Continued)

OTHER PUBLICATIONS

Extended European Search Report dated Jul. 6, 2017 in corresponding European Patent Application No. 14899104.5.

(Continued)

*Primary Examiner* — Ajay Cattungal
(74) *Attorney, Agent, or Firm* — Staas & Halsey LLP

(57) ABSTRACT

A method for transmitting information, a station, and an access point in a MU-MIMO system includes: determining, by a first station, multiple to-be-sent first long training sequences, where the multiple first long training sequences include at least one pilot for phase tracking; and sending, by the first station, the multiple first long training sequences to an access point on multiple symbols, where a second station sends multiple second long training sequences to the access point on the multiple symbols, the multiple second long training sequences include at least one pilot for phase tracking, and a first pilot for phase tracking and a second pilot for phase tracking occupy different time-frequency resources, where the at least one pilot for phase tracking included in the multiple first long training sequences includes the first pilot for phase tracking.

20 Claims, 7 Drawing Sheets

---

A first station determines multiple to-be-sent first LTFs, where the multiple first LTFs include at least one phase tracking pilot — S110

The first station sends the multiple first LTFs to an AP on multiple symbols, where a second station sends multiple second LTFs to the AP on the multiple symbols, the multiple second LTFs include at least one phase tracking pilot, and a first phase tracking pilot and a second phase tracking pilot occupy different time-frequency resources, where the at least one phase tracking pilot included in the multiple first LTFs includes the first phase tracking pilot, and the at least one phase tracking pilot included in the multiple second LTFs includes the second phase tracking pilot — S120

(51) Int. Cl.
*H04W 72/04* (2009.01)
*H04L 25/02* (2006.01)
*H04L 27/26* (2006.01)

(52) U.S. Cl.
CPC ...... *H04L 25/0226* (2013.01); *H04L 27/2613* (2013.01); *H04L 27/2657* (2013.01); *H04W 72/0453* (2013.01)

(58) Field of Classification Search
CPC ........... H04L 27/2657; H04W 72/0453; H04B 7/0452
See application file for complete search history.

(56) References Cited

U.S. PATENT DOCUMENTS

| 9,525,474 | B2* | 12/2016 | Park | H04L 25/0226 |
|---|---|---|---|---|
| 2005/0243939 | A1 | 11/2005 | Jung et al. | |
| 2008/0192776 | A1 | 8/2008 | Fleming et al. | |
| 2014/0140432 | A1 | 5/2014 | Weinholt et al. | |
| 2014/0185662 | A1* | 7/2014 | Azizi | H04L 27/2647 375/232 |
| 2015/0117227 | A1* | 4/2015 | Zhang | H04L 1/0057 370/245 |
| 2015/0117433 | A1* | 4/2015 | Zhang | H04L 69/22 370/338 |
| 2015/0139089 | A1* | 5/2015 | Azizi | H04B 7/0452 370/329 |
| 2016/0156750 | A1* | 6/2016 | Zhang | H04L 69/22 370/338 |
| 2017/0118316 | A1* | 4/2017 | Lee | H04B 7/0452 |

FOREIGN PATENT DOCUMENTS

| CN | 102263746 | 11/2011 |
|---|---|---|
| CN | 102427576 | 4/2012 |
| CN | 102694762 | 9/2012 |
| CN | 103650448 A | 3/2014 |
| EP | 2730071 | 5/2014 |
| WO | 2015/154213 A1 | 10/2015 |

OTHER PUBLICATIONS

Garnier C et al.: "Performance of an OFDM-SDMA based System in a Time-Varying Multi-Path Channel," IEEE 54$^{th}$ Vehicular Technology Conference, VTC Fall 2001, Proceedings, vol. 3, Oct. 7, 2001, pp. 1686-1690, XP010562251.
Yong-Up Jang et al.: "Frame Design and Throughput Evaluation for Practical Multiuser MIMO OFDMA Systems," IEEE Transactions on Vehicular Technology, IEEE Service Center, Piscataway, NJ, US, vol. 60, No. 7, Sep. 1, 2011, pp. 3127-3141, XP011359729.
"3$^{rd}$ Generation Partnership Project: Technical Specification Group Radio Access Network; Physical Layer Aspects For Evolved Universal Terrestrial Radio Access (UTRA) (Release 7)," European Telecommunications Standards Institute (ETSI), 650 Route Des Lucioles; F-06921 Sophia-Antipolis; France, 3GPP TR 25.814 V7.1.0, Sep. 2006, XP014080364.
Richard Van Nee et al.: "UL MU-MIMO for 11ac," Qualcomm, IEEE Draft, IEEE-SA Mentor, Piscataway, NJ, USA, vol. 802.11ac, Jul. 15, 2009, pp. 1-10, XP017678503.
Youhan Kim et al.: "Phase Tracking During VHT-LTF," IEEE Draft, IEEE-SA Mentor, Piscataway, NJ, USA, vol. 802.11ac, Jul. 12, 2010, pp. 1-19, XP017676695.
International Search Report, dated May 6, 2015, in International Application No. PCT/CN2014/083771 (4 pp.).
"Part 16: Air Interface for Fixed Broadband Wireless Access Systems," IEEE Computer Society, IEEE Std 802.16 2004, Oct. 1, 2004.
Chinese Office Action dated May 4, 2018 in corresponding Chinese Patent Application No. 201480057070.9.
International Search Report dated May 6, 2015 in corresponding International Application No. PCT/CN2014/083771.

* cited by examiner

METHOD FOR TRANSMITTING UPLINK INFORMATION IN MULTI-USER MULTIPLE-INPUT MULTIPLE-OUTPUT SYSTEM, AND APPARATUS

CROSS-REFERENCE TO RELATED APPLICATIONS

This application is a continuation of International Application No. PCT/CN2014/083771, filed on Aug. 6, 2014, the disclosure of which is hereby incorporated by reference in its entirety.

TECHNICAL FIELD

Embodiments of the present invention relate to the communications field, and more specifically, to a method for transmitting uplink information in a multi-user multiple-input multiple-output system, and an apparatus.

BACKGROUND

A multiple-input multiple-output (MIMO) technology is one of key technologies of the 802.11n standard protocol. Currently, to further increase a system throughput, the Institute of Electrical and Electronic Engineers (Institute of Electrical and Electronic Engineers, IEEE) is designing the 802.11ac standard. In the 802.11ac standard, a downlink (Multi User Multiple Input Multiple Output, MU-MIMO) technology is introduced, to resolve a problem of asymmetry between quantities of antennas on two sides of a link, and to use a degree of freedom in MIMO more effectively.

To further increase a throughput of a wireless local area network, introduction of an uplink MU-MIMO technology into a wireless local area network (for example, WIFI) system may be considered in the future. The introduction of the uplink MU-MIMO technology is to resolve the problem of asymmetry between quantities of antennas on two sides of a link. In the uplink MU-MIMO technology, multiple stations can simultaneously transmit data to an access point (Access Point, AP). In this case, time synchronization and frequency synchronization need to be ensured for users that simultaneously transmit data. For an orthogonal frequency division multiplexing (OFDM) system, a system bandwidth may be divided into some subcarriers. In this case, frequency synchronization is particularly important. Frequency synchronization can ensure that the subcarriers are orthogonal to each other, so that pieces of data transmitted on the subcarriers do not interfere with each other.

However, stations that simultaneously transmit data are generally not synchronous in frequencies, and the stations and the AP are not synchronous in frequencies. Therefore, when decoding data that is sent on a subcarrier by a station, the AP receives interference imposed both by data that is sent on another subcarrier by the station and by data that is sent on subcarriers by another station. In this case, if a frequency offset between each station and the AP is not estimated and compensated, a bit error rate of the system increases greatly. In another aspect, to correctly decode the data, the AP needs to perform channel estimation by using a long training sequence. However, if the stations are not synchronous in the frequency offsets, a possibility of erroneous channel estimation increases, which causes an increasing probability of errors during subsequent data decoding. Therefore, one of key problems that need to be overcome in uplink MU-MIMO is how to estimate and compensate the frequency offset between each station and the AP. However, currently, in the uplink MU-MIMO technology, there is no method for determining a frequency offset between each station and an AP.

SUMMARY

The present invention provides a method for transmitting uplink information, a station, and an access point in a MU-MIMO system, to determine frequency offset parameters of stations that simultaneously send data to an access point.

According to a first aspect, a method for transmitting uplink information in a MU-MIMO system is provided, where the method includes: determining, by a first station, multiple to-be-sent first long training sequences, where the multiple first long training sequences include at least one pilot for phase tracking; and sending, by the first station, the multiple first long training sequences to an access point on multiple symbols, where a second station sends multiple second long training sequences to the access point on the multiple symbols, the multiple second long training sequences include at least one pilot for phase tracking, and a first pilot for phase tracking and a second pilot for phase tracking occupy different time-frequency resources, where the at least one pilot for phase tracking included in the multiple first long training sequences includes the first pilot for phase tracking, and the at least one pilot for phase tracking included in the multiple second long training sequences includes the second pilot for phase tracking.

According to a second aspect, another method for transmitting uplink information in a MU-MIMO system is provided, where the method includes: receiving, by an access point, long training sequences that are separately sent by Q stations on each symbol of multiple symbols, where multiple long training sequences that are sent by each station of the Q stations on the multiple symbols include at least one pilot for phase tracking, and a first pilot for phase tracking and a second pilot for phase tracking occupy different time-frequency resources, where multiple long training sequences sent by a first station include the first pilot for phase tracking, multiple long training sequences sent by a second station include the second pilot for phase tracking, the Q stations include the first station and the second station, and Q>1; and determining, by the access point, a frequency offset parameter of each station of the Q stations according to pilot for phase tracking s included in multiple long training sequences sent by the Q stations, where the frequency offset parameter of each station is used to represent a frequency offset of each station.

According to a fourth aspect, an access point in a MU-MIMO system is provided, where the access point includes: a receiving module, configured to receive long training sequences that are separately sent by Q stations on each symbol of multiple symbols, where multiple long training sequences that are sent by each station of the Q stations on the multiple symbols include at least one pilot for phase tracking, and a first pilot for phase tracking and a second pilot for phase tracking occupy different time-frequency resources, where multiple long training sequences sent by a first station include the first pilot for phase tracking, multiple long training sequences sent by a second station include the second pilot for phase tracking, the Q stations include the first station and the second station, and Q>1; and a determining module, configured to determine a frequency offset parameter of each station of the Q stations according to pilot for phase tracking s included in multiple long training sequences that are sent by the Q stations and received by the receiving module, where the frequency offset parameter of each station is used to represent a frequency offset of each station.

Based on the foregoing technical solutions, the embodiments of the present invention provide the method for transmitting uplink information, the station, and the access point in a MU-MIMO system. multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset parameter of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

BRIEF DESCRIPTION OF DRAWINGS

To describe the technical solutions in embodiments of the present invention more clearly, the following briefly describes the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that a WLAN communications system that uses a WiFi technology is used as an example to describe the technical solutions of the embodiments of the present invention, but the technical solutions of the embodiments of the present invention may be applied to various communications systems such as: a Global System for Mobile Communications ("GSM" for short) system, a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, LTE time division duplex ("TDD" for short), a Universal Mobile Telecommunications System ("UMTS" for short), and a Worldwide Interoperability for Microwave Access ("WiMAX" for short) communications system.

It should also be understood that, in the embodiments of the present invention, a station may be any user equipment ("UE" for short), a terminal (Terminal), a mobile station ("MS" for short), a mobile terminal (Mobile Terminal), or the like that supports a WiFi communications protocol. The station can communicate with one or more core networks by using a radio access network ("RAN" for short). For example, the station may be a mobile phone (or referred to as a cellular phone) or a computer having a mobile terminal. Alternatively, for example, the station may be a portable, pocket-sized, handheld, built-in-computer, or vehicle-mounted mobile apparatus that exchanges voice and/or data with the radio access network.

It should also be understood that, in the embodiments of the present invention, an AP can provide an access service to the station. The AP may be an access point in WiFi, or may be a base transceiver station ("BTS" for short) in GSM or CDMA, or may be a NodeB in WCDMA, or may be an evolved NodeB (evolved Node B, "eNB" or "e-NodeB" for short) in LTE, which is not limited in the present invention.

Figures 1, 2:
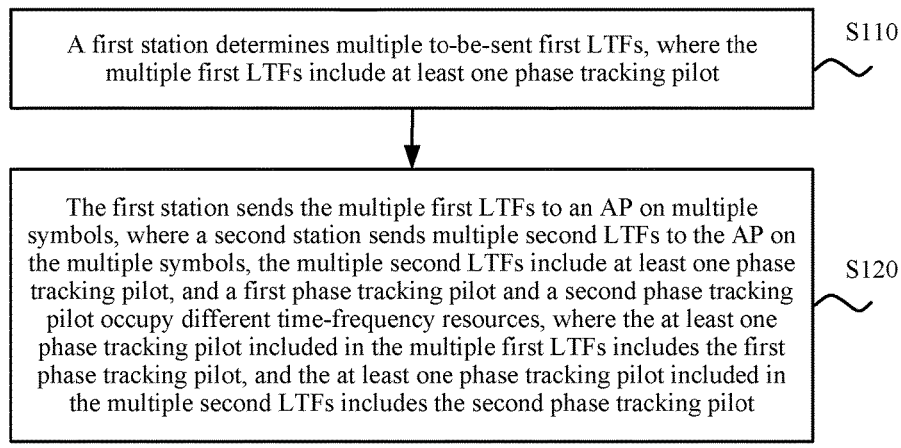
FIG. 1 is a schematic structural diagram of a radio frame in the existing 802.11n protocol and that in the 802.11ac protocol.
FIG. 2 is a schematic flowchart of a method for transmitting uplink information in a MU-MIMO system according to an embodiment of the present invention.

FIG. 1 schematically shows each of structures of a radio frame in the 802.11n protocol and that in the 802.11ac protocol that are used for MIMO data transmission. Each box represents one or more OFDM symbols. As shown in FIG. 1, in the 802.11n protocol, the radio frame used for MIMO data transmission may include multiple symbols. The multiple symbols are sequentially used to bear a legacy short training sequence (L-STF), a legacy long training sequence (L-LTF), a legacy signal field (L-SIG), a throughput signal field (HT-SIG), a high throughput short training sequence (HT-STF), a high throughput long training sequence (HT-LTF), and data (DATA). In the 802.11ac protocol, the radio frame used for MIMO data transmission includes multiple symbols. The multiple symbols are sequentially used to bear an L-STF, an L-LTF, an L-SIG, a very high throughput signal field A (VHT-SIGA), a very high throughput short training sequence (VHT-STF), a very high throughput long training sequence (VHT-LTF), a very high throughput signal field B (VHT-SIGB), and data (DATA). In the 802.11n protocol, channel estimation is performed mainly according to the HT-LTF, and in the 802.11ac protocol, channel estimation is performed mainly according to the VHT-LTF.

It should be understood that a method for transmitting uplink information and an apparatus that are provided in the embodiments of the present invention may be applied to an uplink MU-MIMO technology in which a long training sequence (L-LTF) is used to perform channel estimation, for example, may be applied to the 802.11n protocol or the 802.11ac protocol. In this case, an LTF in the embodiments of the present invention is specifically an HT-LTF or a VHT-LTF, which is not limited in the embodiments of the present invention.

In the embodiments of the present invention, if Q stations simultaneously send $S_{tot}$ data streams to an AP, each of the Q stations need to send $S'_{tot}$ LTFs to the AP before sending the data streams, and the $q^{th}$ station in the Q stations sends $S_q$ data streams to the AP, where $$S_{tot} = \sum_{q=1}^{Q} S_q, S_{tot} \leq P,$$

and P is a total quantity of antennas of the AP. If $S_{tot}$ is an odd number and $S_{tot}>1$, $S'_{tot}=S_{tot}+1$, or if $S_{tot}$ is an even number, $S'_{tot}=S_{tot}$.

Specifically, each station of the Q stations may send the $S'_{tot}$ LTFs to the AP at different time points, and the Q stations may simultaneously send $m^{th}$ LTFs of groups of $S'_{tot}$ LTFs, where m=1, 2, ..., $S'_{tot}$. The $m^{th}$ LTFs simultaneously sent by the Q stations occupy a same frequency band. Correspondingly, the AP receives, at a time point, superposition information of Q LTFs sent by the Q stations at a time point. After sending the $S'_{tot}$ LTFs, the Q stations may simultaneously send the $S_{tot}$ data streams to the AP, where the $S_{tot}$ data streams occupy a same frequency band. Correspondingly, the AP receives, at a time point, superposition information of the $S_{tot}$ data streams sent by the Q stations at a time point.

FIG. 2 shows a method 100 for transmitting uplink information in a MU-MIMO system according to an embodiment of the present invention. The method may be executed by a first station. Optionally, the first station may be a terminal device. As shown in FIG. 2, the method 100 includes:

S110. The first station determines multiple to-be-sent first LTFs, where the multiple first LTFs include at least one pilot for phase tracking.

The multiple to-be-sent first LTFs include the at least one pilot for phase tracking, and the first station is corresponding to the at least one pilot for phase tracking included in the multiple first LTFs. Specifically, at least one first LTF of the multiple first LTFs includes a pilot for phase tracking. For example, each first LTF of the multiple first LTFs may include a pilot for phase tracking; or only some first LTFs of the multiple first LTFs include a pilot for phase tracking, and the other first LTFs do not include a pilot for phase tracking. In addition, if a first LTF in the multiple first LTFs includes a pilot for phase tracking, the first LTF may include one pilot for phase tracking, or include multiple pilot for phase tracking s separately located on different subcarriers, which is not limited in this embodiment of the present invention.

S120. The first station sends the multiple first LTFs to an AP on multiple symbols, where a second station sends multiple second LTFs to the AP on the multiple symbols, the multiple second LTFs include at least one pilot for phase tracking, and a first pilot for phase tracking and a second pilot for phase tracking occupy different time-frequency resources, where the at least one pilot for phase tracking included in the multiple first LTFs includes the first pilot for phase tracking, and the at least one pilot for phase tracking included in the multiple second LTFs includes the second pilot for phase tracking.

The first station may send the multiple first LTFs to the AP on L symbols, and the second station may also send the multiple second LTFs to the AP on same frequency bands of the L symbols. In this case, the AP receives superposition information of the first LTFs and the second LTFs.

The multiple second LTFs include the at least one pilot for phase tracking, and the second station is corresponding to the at least one pilot for phase tracking included in the multiple second LTFs. Specifically, at least one second LTF of the multiple second LTFs includes a pilot for phase tracking. For example, each second LTF of the multiple second LTFs may include a pilot for phase tracking; or only some second LTFs of the multiple second LTFs include a pilot for phase tracking, and the other second LTFs do not include a pilot for phase tracking. In addition, if a second LTF in the multiple second LTFs includes a pilot for phase tracking, the second LTF may include one pilot for phase tracking, or include multiple pilot for phase tracking s separately located on different subcarriers, which is not limited in this embodiment of the present invention.

In order that the AP can determine a frequency offset of each station according to a pilot for phase tracking included in multiple LFTs sent by each station, the first pilot for phase tracking sent by the first station and the second pilot for phase tracking sent by the second station occupy different time-frequency resources, that is, occupy different time domain resources and/or occupy different frequency domain resources. If the first pilot for phase tracking and the second pilot for phase tracking occupy different time domain resources, that is, occupy different symbols, it indicates that a time point at which the first station sends the first pilot for phase tracking is different from a time point at which the second station sends the second pilot for phase tracking, that is, a time point at which the first station sends a first LTF including the first pilot for phase tracking is different from a time point at which the second station sends a second LTF including the second pilot for phase tracking.

Therefore, according to the method for transmitting uplink information in a MU-MIMO system in this embodiment of the present invention, multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset parameter of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

Optionally, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, the first pilot for phase tracking may be any pilot for phase tracking of the at least one pilot for phase tracking included in the multiple first long training sequences, and the second pilot for phase tracking may be any pilot for phase tracking of the at least one pilot for phase tracking included in the multiple second long training sequences. That is, any pilot for phase tracking included in the multiple first long training sequences and any pilot for phase tracking included in the multiple second long training sequences may occupy different time-frequency resources.

Figure 3:
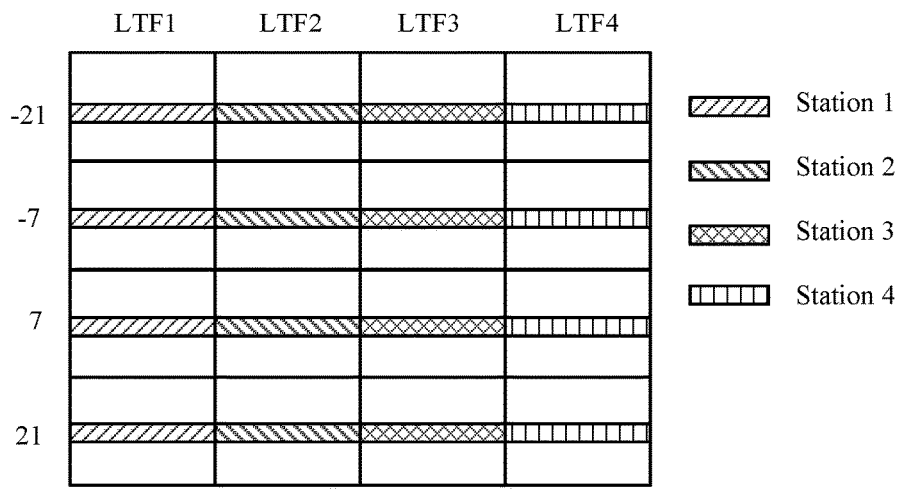
FIG. 3 is an exemplary schematic diagram of a pilot configuration of four LTFs sent by each of four stations to an AP according to an embodiment of the present invention.

The following details a configuration of pilot for phase tracking s in LTFs sent by multiple stations to an AP according to an embodiment of the present invention with reference to specific examples. It is assumed that in a wireless local area network (Wireless Local Area Network, WLAN) system, an AP has four antennas, and four stations each simultaneously send one data stream to the AP by using one antenna. In this case, before sending data, the four stations each need to send four LTFs to the AP. In a time order, the four stations may simultaneously send LTF1s, then simultaneously send LTF2s, then simultaneously send LTF3s, and finally simultaneously send LTF4s. FIG. 3 shows an example of a pilot configuration of four LTFs sent by each of four stations to an AP according to an embodiment of the present invention, where only LTFs including a pilot for phase tracking are shown. As shown in FIG. 3, in four LTFs sent to the AP at a same time point, only an LTF sent by one station includes a pilot for phase tracking. For example, in four LTF1s simultaneously sent by the four stations, only an LTF1 sent by a station 1 includes a pilot for phase tracking; in four LTF2s simultaneously sent by the four stations, only an LTF2 sent by a station 2 includes a pilot for phase tracking. In this case, pilot for phase tracking s sent by any two stations of the four stations occupy different symbols. In addition, in four LTFs sent by a same station to the AP, only one LTF includes a pilot for phase tracking, and the LTF includes four pilot for phase tracking s that occupy different subcarriers. For example, in four LTFs sent by the station 1 to the AP, only the LTF1 includes a pilot for phase tracking, and none of an LTF2 to an LTF4 includes a pilot or phase tracking. Therefore, any two pilot for phase tracking s of multiple pilot for phase tracking s sent by the four stations to the AP occupy different time-frequency resources. Different pilot for phase tracking s sent by a same station to the AP occupy different frequency domain locations in a same symbol, and pilot for phase tracking s sent by different stations to the AP occupy different symbols.

Figure 4:
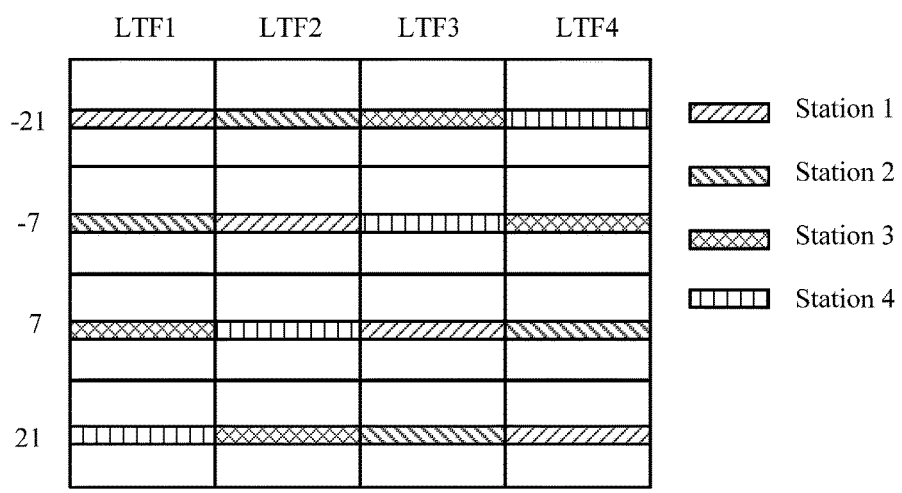
FIG. 4 is another exemplary schematic diagram of a pilot configuration of four LTFs sent by each of four stations to an AP according to an embodiment of the present invention.

That four stations simultaneously send four data streams to an AP is still used as an example. FIG. 4 shows another example of a pilot configuration of LTFs sent by four stations to an AP according to an embodiment of the present invention. As shown in FIG. 4, each LTF sent by each station of the four stations to the AP includes a pilot for phase tracking, but pilot for phase tracking s included in four LTFs sent by each station occupy different frequency domain resources. In addition, in four LTFs simultaneously sent by the four stations to the AP, pilot for phase tracking s corresponding to the stations occupy different frequency domain resources. For example, pilot for phase tracking s included in LTF1s sent by stations 1 to 4 respectively occupy subcarriers whose indexes are −21, −7, +7, and +21, and pilot for phase tracking s included in LTF2s sent by the stations 1 to 4 respectively occupy subcarriers whose indexes are −7, −21, +21, and +7. Therefore, pilot for phase tracking s sent by a same station occupy different symbols and subcarriers, and pilot for phase tracking s sent at a same time point by different stations occupy different subcarriers.

Figures 5, 6:
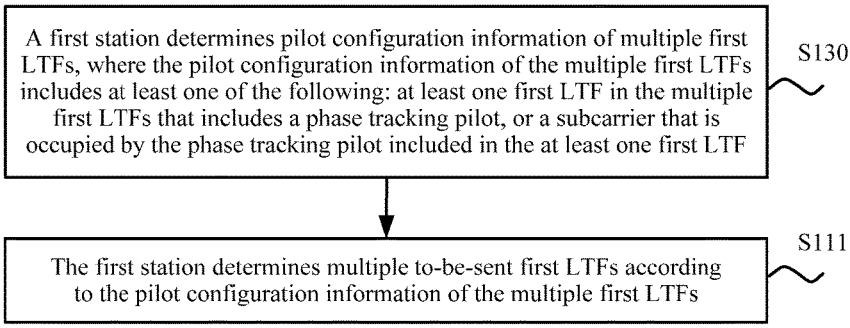
FIG. 5 is still another exemplary schematic diagram of a pilot configuration of four LTFs sent by each of four stations to an AP according to an embodiment of the present invention.
FIG. 6 is another schematic flowchart of a method for transmitting uplink information in a MU-MIMO system according to an embodiment of the present invention.

That four stations simultaneously send four data streams to an AP is still used as an example. FIG. 5 shows still another example of a pilot configuration of LTFs sent by four stations to an AP according to an embodiment of the present invention. As shown in FIG. 5, four LTFs sent by each station to the AP all include a pilot for phase tracking, and pilot for phase tracking s included in the four LTFs sent by each station occupy definite frequency domain resources. For example, pilot for phase tracking s sent by a station 1 occupy subcarriers whose indexes are $n_1$ and $n_5$, and pilot for phase tracking s sent by a station 2 occupy subcarriers whose indexes are $n_2$ and $n_6$. In this case, pilot for phase tracking s included in LTFs simultaneously sent by different stations to the AP occupy different subcarriers.

It should be noted that the examples in FIG. 3 to FIG. 5 are intended to help a person skilled in the art better understand the embodiments of the present invention but not to limit the scope of the embodiments of the present invention. Apparently, a person skilled in the art can make various equivalent modifications or variations according to the provided examples in FIG. 3 to FIG. 5, and such modifications or variations also fall within the scope of the embodiments of the present invention.

Optionally, in another embodiment, as shown in FIG. 6, before S110, the method 100 further includes:

S130. The first station determines pilot configuration information of the multiple first LTFs, where the pilot configuration information of the multiple first LTFs includes at least one of the following: at least one first LTF in the multiple first LTFs that includes a pilot for phase tracking, or a subcarrier that is occupied by the pilot for phase tracking included in the at least one first LTF.

Correspondingly, S110 that the first station determines multiple to-be-sent first LTFs includes:

S111. The first station determines the multiple to-be-sent first LTFs according to the pilot configuration information of the multiple first LTFs.

The first station may determine at least one first LTF in the multiple first LTFs that includes a pilot for phase tracking, and a frequency domain location of the pilot for phase tracking included in the at least one first LTF. If one parameter of the foregoing two parameters is definite, for example, all the first LTFs in the multiple first LTFs that include a pilot for phase tracking, or the frequency domain location of the pilot for phase tracking included in the at least one first LTF are/is definite, the first station needs to determine only the other parameter. In other words, the first station may determine a first LTF in which each pilot for phase tracking of the at least one pilot for phase tracking included in the multiple first LTFs is located and/or a subcarrier occupied by each pilot for phase tracking.

In S130, the first station may determine the pilot configuration information of the multiple first LTFs in various manners. For example, a pilot configuration of the multiple first LTFs is preset, or the AP informs the first station of the pilot configuration information of the multiple first LTFs in advance, which is not limited in this embodiment of the present invention. Similarly, the second station may also determine pilot configuration information of the multiple second LTFs in a similar manner. For brevity, details are not described herein.

Optionally, in another embodiment, before S130, the method 100 further includes:

sending, by the first station, a data transmission request to the AP; and receiving, by the first station, scheduling indication information that is sent by the AP according to the data transmission request, where the scheduling indication information is used to indicate the pilot configuration information of the multiple first LTFs.

Correspondingly, S130 that the first station determines pilot configuration information of the multiple first LTFs includes:

determining, by the first station, the pilot configuration information of the multiple first LTFs according to the scheduling indication information.

The data transmission request sent by the first station may be used to request uplink data transmission to the AP. The data transmission request may include buffered data information of the first station, so that the AP performs scheduling for the first station according to the buffered data information. Similarly, the second station may also send the data transmission request to the AP. After receiving the data transmission requests sent by the first station and the second station, the AP may determine, according to the multiple data transmission requests and a current network status of the AP, to perform scheduling for the first station and the second station to simultaneously send uplink data to the AP, and indicate pilot configuration information corresponding to the first station and that corresponding to the second station. Correspondingly, the first station may determine, according to the scheduling indication information sent by the AP, first LTFs that are in the multiple to-be-sent first LTFs and that include pilot for phase tracking s, and frequency domain locations of the pilot for phase tracking s in these first LTFs, but this embodiment of the present invention is not limited thereto.

The AP may indicate the pilot configuration information of the multiple first LTFs in multiple manners. For example, the AP may explicitly indicate a first LTF in the multiple first LTFs that includes a pilot for phase tracking, or implicitly indicate a first LTF in the multiple first LTFs that does not include a pilot for phase tracking. Alternatively, the first station may pre-store multiple pilot configuration patterns, and each pilot configuration pattern represents a pilot configuration of the multiple first LTFs, where correspondingly, the AP may instruct the first station to use a pilot configuration pattern in the multiple pilot configuration patterns. The multiple pilot configuration patterns may be preset, or the AP informs the first station of the multiple pilot configuration patterns in advance, which is not limited in this embodiment of the present invention.

Optionally, in another embodiment, the scheduling indication information is specifically used to instruct the first station to use a first pilot configuration pattern in multiple preset pilot configuration patterns.

Specifically, the scheduling indication information may include a number of the first pilot configuration pattern, but this embodiment of the present invention is not limited thereto.

Optionally, in another embodiment, each first LTF of the multiple first LTFs further includes a pilot for channel estimation.

In this case, before S120, the method 100 further includes:

performing, by the first station, mapping matrix multiplication processing on only the pilot for channel estimation s in the multiple first LTFs, to obtain the multiple processed first LTFs.

Correspondingly, S120 that the first station sends the multiple first LTFs to an AP on multiple symbols includes:

sending, by the first station, the multiple processed first LTFs to the AP on the multiple symbols.

The first station performs mapping matrix multiplication processing on only the pilot for channel estimation s in the multiple first LTFs, instead of performing mapping matrix multiplication processing on the pilot for phase tracking s included in the multiple first LTFs. A mapping matrix may be a P matrix, and the P matrix is an orthogonal matrix. In this case, the AP receives superposition information of channel tracking pilots included in LTFs that are sent by the first station and the second station at a same time point, and pilot for phase tracking s that are not superposed together, but this embodiment of the present invention is not limited thereto.

Therefore, according to the method for transmitting uplink information in a MU-MIMO system in this embodiment of the present invention, multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset parameter of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

Figure 7:
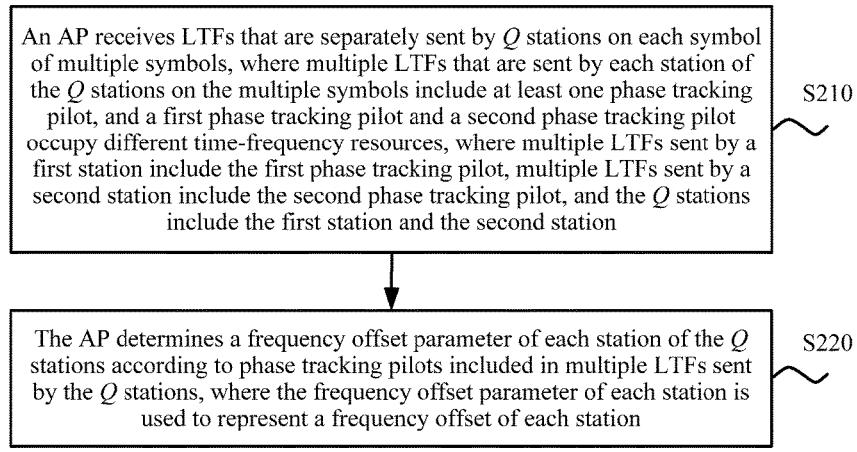
FIG. 7 is a schematic flowchart of a method for transmitting uplink information in a MU-MIMO system according to another embodiment of the present invention.

With reference to FIG. 2 to FIG. 6, the foregoing details, from a perspective of a station, a method for transmitting uplink information in a MU-MIMO system. With reference to FIG. 7, the following details, from a perspective of a network side, a method for transmitting uplink information in a MU-MIMO system according to an embodiment of the present invention.

FIG. 7 shows a schematic flowchart of a method 200 for transmitting uplink information according to an embodiment of the present invention. The method may be executed by any proper network side apparatus. For ease of description, that the method 200 is executed by an AP is used as an example in the following description, which is not limited in this embodiment of the present invention. As shown in FIG. 7, the method 200 includes:

S210. The AP receives LTFs that are separately sent by Q stations on each symbol of multiple symbols, where multiple LTFs that are sent by each station of the Q stations on the multiple symbols include at least one pilot for phase tracking, and a first pilot for phase tracking and a second pilot for phase tracking occupy different time-frequency resources, where multiple LTFs sent by a first station include the first pilot for phase tracking, multiple LTFs sent by a second station include the second pilot for phase tracking, the Q stations include the first station and the second station, and Q>1.

Each station of the Q stations sends multiple LTFs to the AP, and the Q stations send respective multiple LTFs on same frequency bands of same multiple symbols. For example, the Q stations may simultaneously and separately send a first LTF to the AP on a first frequency band of a first time point, and simultaneously and separately send a second LTF to the AP on a first frequency band of a second time point, and so on, which is not limited in this embodiment of the present invention.

The Q stations include the first station and the second station. The multiple LTFs sent by the first station to the AP include at least one pilot for phase tracking, and the at least one pilot for phase tracking includes the first pilot for phase tracking. The multiple LTFs sent by the second station to the AP include at least one pilot for phase tracking, and the at least one pilot for phase tracking includes the second pilot for phase tracking. The first pilot for phase tracking and the second pilot for phase tracking occupy different time-frequency resources, that is, occupy different symbols and/or different subcarriers.

Specifically, at least one LTF of the multiple LTFs sent by the first station includes a pilot for phase tracking. For example, each LTF of the multiple LTFs includes a pilot for phase tracking; or some LTFs of the multiple LTFs include a pilot for phase tracking. In addition, each LTF of the at least one LTF may include one or more pilot for phase tracking s. Similarly, at least one LTF of the multiple LTFs sent by the second station includes a pilot for phase tracking, and each LTF of the at least one LTF may include one or more pilot for phase tracking s, which is not limited in this embodiment of the present invention.

S220. The AP determines a frequency offset parameter of each station of the Q stations according to pilot for phase tracking s included in multiple LTFs sent by the Q stations, where the frequency offset parameter of each station is used to represent a frequency offset of each station.

The AP may determine the frequency offset parameter of each station according to at least one pilot for phase tracking included in multiple LTFs sent by each station of the Q stations, that is, determine a frequency offset parameter of the $i^{th}$ station according to at least one pilot for phase tracking included in multiple LTFs sent by the $i^{th}$ station, where $1 \leq i \leq Q$. Alternatively, the AP may determine a frequency offset parameter of each station according to multiple pilot for phase tracking s included in multiple LTFs sent by all the stations of the Q stations, that is, determine a frequency offset parameter of the $i^{th}$ station according to the multiple pilot for phase tracking s included in the multiple LTFs sent by all the stations, which is not limited in this embodiment of the present invention.

Therefore, according to the method for transmitting uplink information in a MU-MIMO system in this embodiment of the present invention, an AP receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset parameter of each station of the multiple stations according to the received pilot for phase tracking s separately sent by the multiple stations, and then takes a frequency offset of each station of the multiple stations into consideration when performing channel estimation. This can improve channel estimation accuracy and improve system performance.

Optionally, that the first pilot for phase tracking and the second pilot for phase tracking occupy different time-frequency resources includes:
the first pilot for phase tracking and the second pilot for phase tracking occupy different symbols; or
the first pilot for phase tracking and the second pilot for phase tracking occupy a same symbol, and the first pilot for phase tracking and the second pilot for phase tracking occupy different subcarriers.

Optionally, the first pilot for phase tracking may be any pilot for phase tracking included in the multiple long training sequences sent by the first station, and the second pilot for phase tracking may be any pilot for phase tracking included in the multiple long training sequences sent by the second station.

Optionally, in another embodiment, a pilot for phase tracking included in a first LTF sent by each station of the Q stations skips undergoing mapping matrix multiplication processing, and the multiple LTFs sent by each station include the first LTF.

In this case, the first pilot for phase tracking and the second pilot for phase tracking may both skip undergoing mapping matrix multiplication processing. When sending multiple LTFs to the AP, each station of the Q stations may not perform mapping matrix multiplication processing on the at least one pilot for phase tracking included in the multiple LTFs. If the multiple LTFs further include other information, for example, a pilot for channel estimation, the station may perform mapping matrix multiplication processing on the other information separately included in the multiple LTFs, and send multiple processed LTFs to the AP. A mapping matrix may be a P matrix, and the P matrix is an orthogonal matrix. However, this embodiment of the present invention is not limited thereto.

Figure 8:
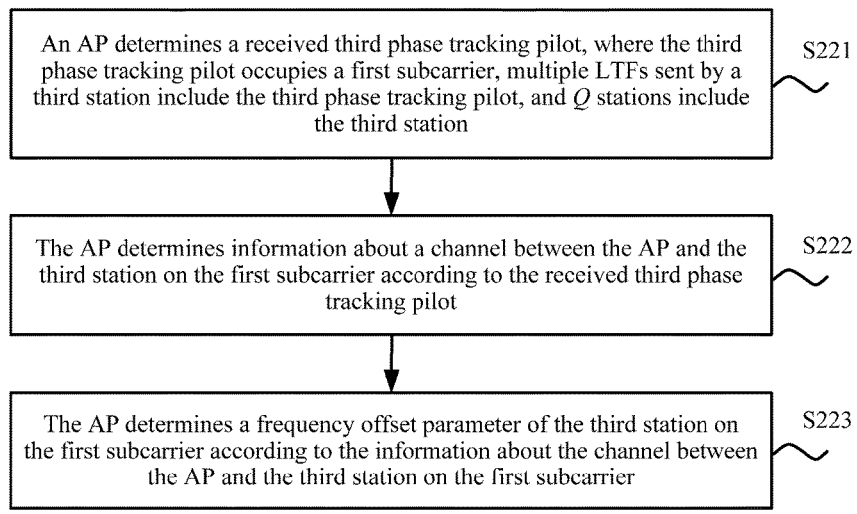
FIG. 8 is another schematic flowchart of a method for transmitting uplink information in a MU-MIMO system according to another embodiment of the present invention.

In S220, the AP may determine the frequency offset parameters of the Q stations in multiple manners. In an optional embodiment, as shown in FIG. 8, S220 that the AP determines a frequency offset parameter of each station of the Q stations according to pilot for phase tracking s included in multiple LTFs sent by the Q stations includes:

S221. The AP determines a received third pilot for phase tracking, where the third pilot for phase tracking occupies a first subcarrier, multiple LTFs sent by a third station include the third pilot for phase tracking, and the Q stations include the third station.

S222. The AP determines information about a channel between the AP and the third station on the first subcarrier according to the received third pilot for phase tracking.

S223. The AP determines a frequency offset parameter of the third station on the first subcarrier according to the information about the channel between the AP and the third station on the first subcarrier.

The Q stations include the third station. The third station may be the first station or the second station, or the third station is a station in the Q stations except the first station and the second station, which is not limited in this embodiment of the present invention.

The third station sends the multiple LTFs to the AP. The multiple LTFs include at least one pilot for phase tracking, and the at least one pilot for phase tracking includes the third pilot for phase tracking that occupies the first subcarrier.

The AP learns in advance an LTF that is sent by the third station and that includes the third pilot for phase tracking, and the third pilot for phase tracking is not superposed with other information. Therefore, the AP may determine, from received information, the third tracking pilot transmitted through the channel. In addition, the AP learns content of the third pilot for phase tracking sent by the third station. Therefore, the AP may determine the information about the channel between the AP and the third station on the first subcarrier according to the received third pilot for phase tracking and the third tracking pilot sent by the third station.

It is assumed that a number of the third station is q, a number of the first subcarrier is n, and a number of a symbol occupied by the third pilot for phase tracking is i. Then, the third pilot for phase tracking that is transmitted through the channel and received by the AP may be determined by using the following formula:

$$Y_{p,q,n,i} = h_{p,q,n,i} \times x_{q,n,i} e^{j2\pi N_B(k+q-1)v_q/N} \qquad (1)$$

where $Y_{p,q,n,i}$ represents the third pilot for phase tracking that is sent by the third station and received by the $p^{th}$ receive antenna of the AP on the first subcarrier, $h_{p,q,n,i}$ represents information about an original channel between the $p^{th}$ receive antenna of the AP and the third station on the first subcarrier, $x_{q,n,i}$ represents the third pilot for phase tracking sent by the third station, k represents a number of a start symbol of multiple LTFs that are separately sent by the Q stations and received by the AP, $v_q$ represents a frequency offset value of the third station, N represents a quantity of system subcarriers, $N_B = N + N_{CP}$, and $N_{CP}$ represents a length of a cyclic prefix (Cyclic prefix, CP).

According to formula (1), the AP may determine the information about the channel between the AP and the third station on the first subcarrier as follows:

$$\tilde{h}_{p,q,n,i} = h_{p,q,n,i} e^{j2\pi N_B(k+q-1)v_q/N} = Y_{p,q,n,i}/x_{q,n,i} \qquad (2)$$

where $\tilde{h}_{p,q,n,i}$ represents information about an equivalent channel between the $p^{th}$ antenna of the AP and the third station on the first subcarrier. For ease of description, it is assumed herein that the third station sends one data stream to the AP. If the third station sends multiple data streams to the AP, $h_{p,q,n,i}$ and $\tilde{h}_{p,q,n,i}$ respectively represent information about an original channel between the $p^{th}$ receive antenna of the AP and an antenna of the third station on the first subcarrier and information about an equivalent channel between the $p^{th}$ receive antenna of the AP and the antenna of the third station on the first subcarrier. A person of ordinary skill in the art can easily extend formula (2) and formula (3) from the case in which the third station sends one data stream to the case in which the third station sends multiple data streams to the AP.

Optionally, in another embodiment, the frequency offset parameter of the third station on the first subcarrier includes: an amount by which a phase rotation of the third station on the first subcarrier changes with time.

In this case, in an optional embodiment, S223 that the AP determines a frequency offset parameter of the third station on the first subcarrier according to the information about the channel between the AP and the third station on the first subcarrier includes:

determining, by the AP, a received fourth pilot for phase tracking that occupies the first subcarrier, where the multiple LTFs sent by the third station include the fourth pilot for phase tracking, and the third pilot for phase tracking and the fourth pilot for phase tracking occupy different symbols; and determining, by the AP according to the received fourth pilot for phase tracking and the information about the channel between the AP and the third station on the first subcarrier, the amount by which the phase rotation of the third station on the first subcarrier changes with time.

The multiple LTFs sent by the third station to the AP include the fourth pilot for phase tracking. The fourth pilot for phase tracking occupies the first subcarrier, and the third pilot for phase tracking and the fourth pilot for phase tracking occupy different symbols, that is, the third station sends, at different time points, an LTF including the third pilot for phase tracking and an LTF including the fourth pilot for phase tracking.

The AP already learns the fourth pilot for phase tracking sent by the third station, the received fourth pilot for phase tracking transmitted through a channel, and the information about the channel between the third station and the AP on the first subcarrier. Therefore, the AP may determine, according to the learned information, the amount by which the phase rotation of the third station on the first subcarrier changes with a symbol.

It is assumed that a number of a symbol occupied by the fourth pilot for phase tracking is j. In an optional embodiment, the amount $e^{j\Delta\theta_{ji,q,n}}$ by which the phase rotation of the third station on the first subcarrier changes with time is determined by using the following formula:

$$e^{j\Delta\theta_{ji,p,q,n}} = Y_{j,p,q,n}/(\tilde{h}_{i,p,q,n} \times x_{j,q,n}) \qquad (3)$$

where $Y_{j,p,q,n}$ represents the fourth pilot for phase tracking received by the $p^{th}$ antenna of the AP, $x_{j,q,n}$ represents the fourth pilot for phase tracking sent by the third station, and $\tilde{h}_{i,p,q,n}$ represents the information about the channel between the AP and the third station on the first subcarrier (specifically, the information about the equivalent channel).

$e^{j\Delta\theta_{ji,p,q,n}}$ represents an amount that is corresponding to the $p^{th}$ antenna and by which a phase rotation of the third station on the subcarrier n of the symbol j changes in relative to a phase rotation on the subcarrier n of the symbol i. Optionally, in another embodiment, the AP may also determine an amount that is corresponding to another antenna and by which a phase rotation of the third station on the subcarrier n of the symbol j changes in relative to the phase rotation on the subcarrier n of the symbol i, and average amounts that are corresponding to the antennas of the AP and by which phase rotations of the third station on the subcarrier n of the symbol j change in relative to the phase rotations on the subcarrier n of the symbol i, to obtain a final amount by which a phase rotation of the third station on the subcarrier n of the symbol j changes in relative to a phase rotation on the subcarrier n of the symbol i. The change amount that is finally obtained is more accurate than the change amounts respectively corresponding to the antennas. However, this embodiment of the present invention is not limited thereto.

Optionally, the AP may further determine a phase rotation of the third station on a first subcarrier of another symbol relative to a phase rotation of the third station on the symbol i according to a pilot for phase tracking that is included in the multiple LTFs sent by the third station and received by the AP and that occupies the first subcarrier of the another symbol, that is, according to a pilot for phase tracking that is included in the multiple LTFs sent by the third station and that is received on the first subcarrier of the another symbol. In an optional embodiment, the symbol i may be a symbol that is occupied by the first LTF in the multiple LTFs sent by the third station to the AP, that is, the first symbol in the multiple symbols, which is not limited in this embodiment of the present invention.

In this case, a frequency offset value $v_{q,\Delta t}$ of the third station at a time point may be represented by $v_{q,\Delta t} = v_{q,con} + \Delta v_{q,var}(t)$, where $v_{q,con}$ represents a constant residual frequency offset of the third station, and $\Delta v_{q,var}(t)$ represents a frequency offset jitter of the third station. The frequency offset jitter may be caused by a temperature change or transceiver switching, which is not limited in this embodiment of the present invention.

Optionally, in another embodiment, if the frequency offset jitter of the third station is small enough to be ignored, the frequency offset value of the third station may be approximately considered as a constant. In this case, the frequency offset parameter of the third station on the first subcarrier includes a frequency offset value of the third station on the first subcarrier.

In this case, in another embodiment, the method 200 further includes:

receiving, by the AP, at least one data stream that is sent by each station of the Q stations on a first symbol, where the at least one data stream sent by each station includes a fifth pilot for phase tracking that occupies the first subcarrier; and determining, by the AP, superposition information that is of the fifth phase pilots respectively corresponding to the Q stations and that is received on the first subcarrier.

Correspondingly, S223 that the AP determines a frequency offset parameter of the third station on the first subcarrier according to the information about the channel between the AP and the third station on the first subcarrier includes:

determining, by the AP, the frequency offset value of the third station on the first subcarrier according to the information about the channel between the AP and the third station on the first subcarrier and the superposition information received by the AP.

After separately sending multiple LTFs to the AP, the Q stations may simultaneously send multiple data streams to the AP on the first symbol. Each station of the Q stations may send at least one data stream to the AP, and a total quantity of data streams simultaneously sent by the Q stations to the AP is less than or equal to a quantity of antennas of the AP.

Each data stream of the multiple data streams sent by the Q stations on the first symbol may include a pilot for phase tracking, and pilot for phase tracking s included in each data stream in the multiple data streams occupy same spectrum resources, for example, pilot for phase tracking s included in each data stream occupy subcarriers whose indexes are separately ±7 and ±21, but this embodiment of the present invention is not limited thereto.

Before sending at least one data stream to the AP, each station of the Q stations may perform mapping matrix multiplication processing on the at least one data stream, to obtain at least one processed data stream, and send the at least one processed data stream. Performing mapping matrix multiplication processing on the at least one data stream may include: performing mapping matrix multiplication processing on a pilot for phase tracking included in the at least one data stream, which is not limited in this embodiment of the present invention.

Because multiple fifth pilot for phase tracking s included in the multiple data streams simultaneously sent by the Q stations occupy a same subcarrier, the multiple fifth pilot for phase tracking s are superposed together after being transmitted through a channel. Correspondingly, the AP receives the superposition information of the fifth pilot for phase tracking s respectively corresponding to the Q stations. Assuming that the first symbol is the $g^{th}$ symbol that bears data, a number of the first symbol may be represented by $k+S'_{tot}-g$. If each station of the Q stations sends one data stream to the AP, and Q is an even number, $S'_{tot}=Q$. Optionally, the superposition information that is of the multiple fifth pilot for phase tracking s transmitted through the channel and that is received by the AP may be represented by using the following formula:

$$Y'_{p,n,g} = \sum_{q=1}^{Q} h_{p,q,n,g} x'_{q,n,g} e^{j2\pi N_B(k+S'_{tot}+g-1)w_q/N} \qquad (4)$$

where $Y'_{p,n,g}$ represents the superposition information received by the $p^{th}$ receive antenna of the AP on the first subcarrier, $h_{p,q,n,g}$ represents the information about the original channel between the $p^{th}$ receive antenna of the AP and the third station on the first subcarrier, and $x'_{q,n,g}$ represents the fifth pilot for phase tracking corresponding to a station numbered q among the Q stations, that is, the fifth pilot for phase tracking included in at least one data stream sent by the station numbered q.

The AP learns in advance the fifth pilot for phase tracking sent by each of the Q stations. In this case, the AP may determine the frequency offset value of the third station according to the superposition information received on the first subcarrier, the fifth pilot for phase tracking corresponding to each station of the Q stations, and the information about the channel between the AP and the third station on the first subcarrier. In an optional embodiment, S220 that the AP determines a frequency offset parameter of each station of the Q stations according to pilot for phase tracking s included in multiple LTFs sent by the Q stations further includes:

determining, by the AP, a received sixth pilot for phase tracking sent by each other station of at least one other station, where multiple LTFs sent by each other station include the sixth pilot for phase tracking, the sixth pilot for phase tracking occupies the first subcarrier, and the at least one other station is a station in the Q stations except the third station; and determining, by the AP, information about a channel between each other station and the AP on the first subcarrier according to the received sixth pilot for phase tracking sent by each other station.

The multiple LTFs that are sent by each other station of the at least one other station to the AP include the sixth pilot for phase tracking that occupies the first subcarrier. The at least one other station may be some or all of the Q stations except the third station, that is, a quantity of the at least one other station may be an integer that is less than or equal to (Q−1). That the at least one other station is all the stations of the Q stations except the third station is used as an example in the following description, but this embodiment of the present invention is not limited thereto.

Correspondingly, the determining, by the AP, the frequency offset value of the third station on the first subcarrier according to the information about the channel between the AP and the third station on the first subcarrier and the superposition information received by the AP includes:

determining, by the AP, the frequency offset value of the third station on the first subcarrier according to the information about the channel between the AP and each station of the Q stations on the first subcarrier and the superposition information received by the AP.

The at least one other station may be (Q−1) stations in the Q stations except the third station. The AP learns in advance the sixth pilot for phase tracking sent by each other station, and therefore, may determine information about a channel between each other station and the AP on the first subcarrier by using a method similar to formula (2). In this case, the AP obtains the information about the channel between each station of the Q stations and the AP on the first subcarrier, the fifth pilot for phase tracking sent by each station of the Q stations, and the superposition information that is of the multiple fifth pilot for phase tracking s transmitted through the channel and that is received by the AP, and therefore, may determine the frequency offset value of the third station on the first subcarrier according to these information.

In an optional embodiment, the frequency offset value $v_q$ of the third station on the first subcarrier is determined by using the following formula:

$$Y'_{p,n,g} = \sum_{q=1}^{Q} \tilde{h}_{p,q,n,g} x'_{q,n,g} e^{j2\pi N_B(S'_{tot}+g-q)v_q/N} \quad (5)$$

where $N_B=N+N_{CP}$, N represents a quantity of sub-bands of a system, $N_{CP}$ represents the length of the cyclic prefix, the first symbol is the $g^{th}$ symbol of symbols used to bear data, $S'_{tot}$ represents a total quantity of data streams to be simultaneously sent by the Q stations to the access point, $Y'_{p,n,g}$ represents the superposition information received by the $p^{th}$ receive antenna of the AP on the first subcarrier, $\tilde{h}_{p,q,n,g}$ represents the information about the channel between the $p^{th}$ receive antenna of the AP and the third station on the first subcarrier (specifically, the information about the equivalent channel), and $x'_{q,n,g}$ represents the fifth pilot for phase tracking corresponding to the station numbered q among the Q stations.

Optionally, in another embodiment, S220 that the AP determines a frequency offset parameter of each station of the Q stations according to pilot for phase tracking s included in multiple LTFs sent by the Q stations further includes:

determining, by the AP, a frequency offset value of each other station of the at least one other station on the first subcarrier according to the information about the channel between the AP and each station of the Q stations on the first subcarrier and the superposition information received by the AP.

In this case, the AP may further determine the frequency offset value of each station of the Q stations on the first subcarrier by using formula (5). Specifically, the frequency offset value of each station of the Q stations on the first subcarrier may be determined by using the following formula:

$$\begin{bmatrix} Y'_{1,n,g} \\ Y'_{2,n,g} \\ \vdots \\ Y'_{P,n,g} \end{bmatrix} = \begin{bmatrix} \tilde{h}_{1,1,n} & \tilde{h}_{1,2,n} & \cdots & \tilde{h}_{1,Q,n} \\ \tilde{h}_{2,1,n} & \tilde{h}_{2,2,n} & \cdots & \tilde{h}_{2,Q,n} \\ \vdots & \vdots & \ddots & \vdots \\ \tilde{h}_{P,1,n} & \tilde{h}_{P,2,n} & \cdots & \tilde{h}_{P,Q,n} \end{bmatrix} \begin{bmatrix} x'_{1,n,g} e^{j2\pi N_B(S'_{tot}+g-1)v_1/N} \\ x'_{2,n,g} e^{j2\pi N_B(S'_{tot}+g-1)v_2/N} \\ \vdots \\ x'_{Q,n,g} e^{j2\pi N_B(S'_{tot}+g-1)v_Q/N} \end{bmatrix} \quad (6)$$

Therefore, if frequency offset parameters of the Q stations are frequency offset values of the Q stations, S220 may include:

determining, by the AP, a target pilot for phase tracking that is included in the multiple received LTFs sent by each station of the Q stations, where the target pilot for phase tracking occupies the first subcarrier;

determining, by the AP, information about a channel between the AP and each station on the first subcarrier according to the received target pilot for phase tracking corresponding to each station of the Q stations; and determining, by the AP, a frequency offset parameter of each station of the Q stations according to the information about the channel between the AP and each station of the Q stations on the first subcarrier.

The frequency offset parameter may be a frequency offset value or an amount by which a phase rotation changes. Specifically, the target pilot for phase tracking corresponding to the third station may be the third pilot for phase tracking, and the target pilot for phase tracking corresponding to each station of the at least one other station may be the sixth pilot for phase tracking, but this embodiment of the present invention is not limited thereto. Optionally, the AP may determine information about a channel between each station of the Q stations and the $p^{th}$ antenna of the AP on the first subcarrier according to formula (2), but this embodiment of the present invention is not limited thereto.

Optionally, the determining, by the AP, a frequency offset value of each station of the Q stations according to the information about the channel between the AP and each station of the Q stations on the first subcarrier may include:

determining, by the AP, the frequency offset value of each station of the Q stations on the first subcarrier according to the information about the channel between the AP and each station of the Q stations on the first subcarrier and the superposition information received by the AP. Optionally, the AP may specifically determine the frequency offset value of each station according to formula (5) or (6), which is not limited in this embodiment of the present invention.

Optionally, in another embodiment, S220 that the AP determines a frequency offset parameter of each station of the Q stations according to pilot for phase tracking s included in multiple LTFs sent by the Q stations further includes:

determining, by the AP, a frequency offset parameter of the third station on a second subcarrier; and averaging, by the AP, the frequency offset parameter of the third station on the first subcarrier and the frequency offset parameter of the third station on the second subcarrier, to obtain an average frequency offset parameter of the third station.

The pilot configuration shown in FIG. 3 and that the frequency offset parameter of the third station is specifically the frequency offset value of the third station are used as an example. The average frequency offset value $\bar{v}_q$ of the third station may be determined by using the following formula:

$$e^{j2\pi N_B(Q+g-1)\bar{v}_q/N} = \frac{1}{4} \sum_{n \in \pm 7, \pm 21} e^{j2\pi N_B(Q+g-1)v_{q,n}/N} \quad (7)$$

where $v_{q,n}$ represents a frequency offset value of the third station on a subcarrier n.

The pilot configuration shown in FIG. 5 is used as an example. The frequency offset parameter of the third station is specifically an amount by which a phase rotation of the third station on a symbol k changes in relative to a phase rotation on the symbol i, and $S'_{tot}=Q$. Therefore, the amount $e^{j\Delta\bar{\theta}_{ki}}$ by which the phase rotation of the third station changes may be determined by using the following formula:

$$e^{j\Delta\bar{\theta}_{ki}} = \frac{1}{2}\left(e^{j\Delta\theta_{ki,D(q,1)}} + e^{j\Delta\theta_{ki,D(q,2)}}\right) \quad (8)$$

where $e^{j\Delta\Theta_{ki,D(q,1)}}$ represents an amount by which a phase rotation of the third station on the first subcarrier occupied by the pilot for phase tracking changes, and $e^{j\Delta\Theta_{ki,D(q,2)}}$ represents an amount by which a phase rotation of the third station on the second subcarrier occupied by the pilot for phase tracking changes.

The average frequency offset parameter of the third station is more accurate than an offset parameter of the third station on each subcarrier.

Optionally, in another embodiment, the method 200 further includes:

performing, by the AP, correction processing on a mapping matrix according to the frequency offset parameter of each station of the Q stations; and performing, by the AP according to the mapping matrix that has undergone the correction processing, channel estimation on a channel occupied by multiple data streams that are sent by the Q stations on the first symbol.

Each LTF of the multiple LTFs sent by each of the Q stations to the AP may further include a pilot for channel estimation. The AP may perform, according to the mapping matrix that has undergone the correction processing and multiple pilot for channel estimation s received by the AP, channel estimation on a channel occupied by multiple data streams. However, this embodiment of the present invention is not limited thereto.

The foregoing case in which four stations each send four LTFs to the AP is still used as an example. The mapping matrix may be shown in formula (8). If the frequency offset parameters of the Q stations are the frequency offset values of the Q stations, for example, as shown in FIG. 3 or FIG. 4, the mapping matrix that has undergone the correction may be represented by formula (9). If the frequency offset parameters of the Q stations are amounts by which phase rotations of the Q stations change, for example, as shown in FIG. 5, the mapping matrix that has undergone the correction may be represented by formula (10).

sending, by the AP, scheduling indication information to the Q stations according to the data transmission request sent by each of the Q stations, where the scheduling indication information is used to indicate pilot configuration information of the multiple LTFs to be sent by each station of the Q stations.

That the AP receives the LTFs that are separately sent by the Q stations on each symbol of the multiple symbols includes:

the AP receives the LTFs that are separately sent by the Q stations on each symbol of the multiple symbols according to the scheduling indication information.

Specifically, the pilot configuration information of the multiple LTFs to be sent by the station includes at least one of the following: at least one LTF in the multiple to-be-sent LTFs that includes a pilot for phase tracking, or a subcarrier occupied by the pilot for phase tracking included in the at least one LTF.

The data transmission request sent by each of the Q stations may be used to request uplink data transmission to the AP. The data transmission request sent by the station may include buffered data information of the station, so that the AP performs scheduling for the station according to the buffered data information. After receiving the data transmission requests sent by the Q stations, the AP may determine, according to the multiple data transmission requests and a current network status of the AP, to perform scheduling for the Q stations to simultaneously send uplink data to the AP, and indicate pilot configuration information respectively corresponding to the Q stations, but this embodiment of the present invention is not limited thereto.

The AP may send the scheduling indication information to the Q stations in multiple manners. For example, the AP may broadcast the scheduling indication information or perform multicast on the scheduling indication information to the Q stations. In this case, the scheduling indication information may include the pilot configuration information correspond- $$P = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad (8)$$

$$P' = \begin{bmatrix} 1e^{j2\pi N_B k v_1/N} & -1e^{j2\pi N_B(k+1)v_1/N} & 1e^{j2\pi N_B(k+2)v_1/N} & 1e^{j2\pi N_B(k+3)v_1/N} \\ 1e^{j2\pi N_B k v_2/N} & 1e^{j2\pi N_B(k+1)v_2/N} & -1e^{j2\pi N_B(k+2)v_2/N} & 1e^{j2\pi N_B(k+3)v_2/N} \\ 1e^{j2\pi N_B k v_3/N} & 1e^{j2\pi N_B(k+1)v_3/N} & 1e^{j2\pi N_B(k+2)v_3/N} & -1e^{j2\pi N_B(k+3)v_3/N} \\ -1e^{j2\pi N_B k v_4/N} & 1e^{j2\pi N_B(k+1)v_4/N} & 1e^{j2\pi N_B(k+2)v_4/N} & 1e^{j2\pi N_B(k+3)v_4/N} \end{bmatrix} \quad (9)$$

$$P' = \begin{bmatrix} 1 & -1e^{j\Delta\theta_{2,1}} & 1e^{j\Delta\theta_{3,1}} & 1e^{j\Delta\theta_{4,1}} \\ 1 & 1e^{j\Delta\theta_{2,2}} & -1e^{j\Delta\theta_{3,2}} & 1e^{j\Delta\theta_{4,2}} \\ 1 & 1e^{j\Delta\theta_{2,3}} & 1e^{j\Delta\theta_{3,3}} & -1e^{j\Delta\theta_{4,3}} \\ -1 & 1e^{j\Delta\theta_{2,4}} & 1e^{j\Delta\theta_{3,4}} & 1e^{j\Delta\theta_{4,4}} \end{bmatrix} \quad (10)$$

In this embodiment of the present invention, the AP may perform channel estimation by using many methods, for example, a least square (Least Square, LS) method or an MMSE (Minimum Mean Square Error, minimum mean square error) method, which is not limited in this embodiment of the present invention.

Optionally, in another embodiment, before S210, the method 200 further includes:

receiving, by the AP, a data transmission request sent by each station of the Q stations; and ing to the stations. Alternatively, the AP may perform unicast on scheduling indication information to each of the Q stations, and scheduling indication information sent to a station may be used to indicate only pilot configuration information corresponding to the station, that is, specific pieces of content of scheduling indication information sent by the AP to the stations are different, which is not limited in this embodiment of the present invention.

The AP may indicate, in multiple manners, the pilot configuration information respectively corresponding to the Q stations. In an optional embodiment, the scheduling indication information may be specifically used to instruct the first station in the Q stations to use a first pilot configuration pattern in multiple preset pilot configuration patterns.

Specifically, the scheduling indication information may include a number of the first pilot configuration pattern, but this embodiment of the present invention is not limited thereto.

Therefore, according to the method for transmitting uplink information in a MU-MIMO system in this embodiment of the present invention, an AP receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset parameter of each station of the multiple stations according to the received pilot for phase tracking s separately sent by the multiple stations, and then takes a frequency offset of each station of the multiple stations into consideration when performing channel estimation. This can improve channel estimation accuracy and reduce a bit error rate.

Figure 9:
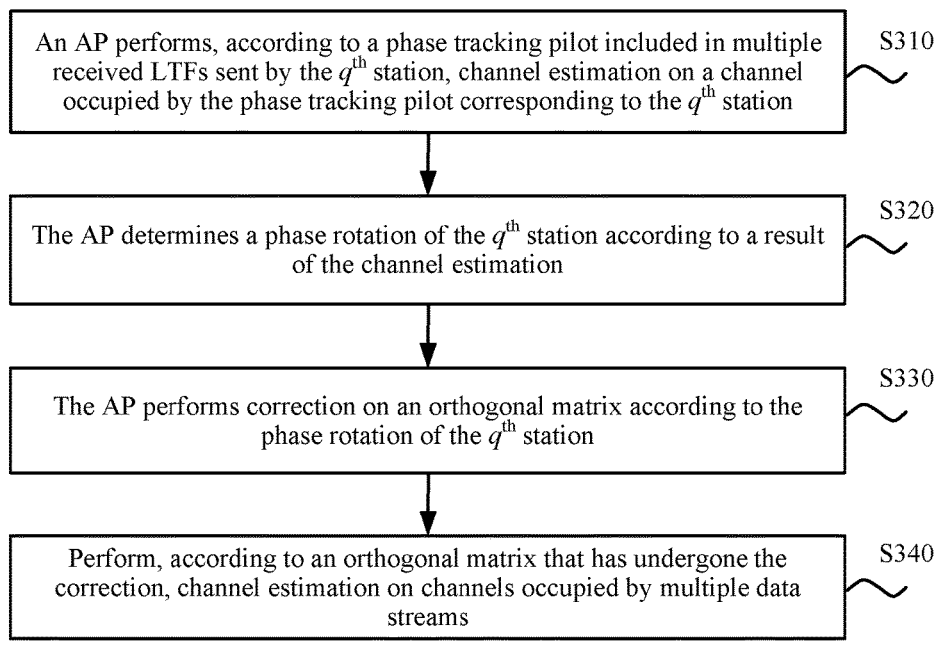
FIG. 9 is a schematic flowchart of a method for transmitting uplink information in a MU-MIMO system according to still another embodiment of the present invention.

FIG. 9 shows an example of a process of a method 300 for transmitting uplink information in a MU-MIMO system according to an embodiment of the present invention. The method may be executed by an AP. The AP receives multiple LTFs sent by each station of Q stations and multiple data streams simultaneously sent by the Q stations.

S310. The AP performs, according to a pilot for phase tracking included in multiple received LTFs sent by the $q^{th}$ station, channel estimation on a channel occupied by the pilot for phase tracking corresponding to the $q^{th}$ station, where q=1, 2, ..., Q.

S320. The AP determines a phase rotation of the $q^{th}$ station according to a result of the foregoing channel estimation.

S330. The AP performs correction on a mapping matrix according to the phase rotation of the $q^{th}$ station.

S340. Perform, according to the mapping matrix that has undergone the correction, channel estimation on a channel occupied by the multiple data streams.

Therefore, according to the method for transmitting uplink information in a MU-MIMO system in this embodiment of the present invention, an AP receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset parameter of each station of the multiple stations according to the received pilot for phase tracking s separately sent by the multiple stations, and then takes a frequency offset of each station of the multiple stations into consideration when performing channel estimation. This can improve channel estimation accuracy and reduce a bit error rate.

Figure 10:
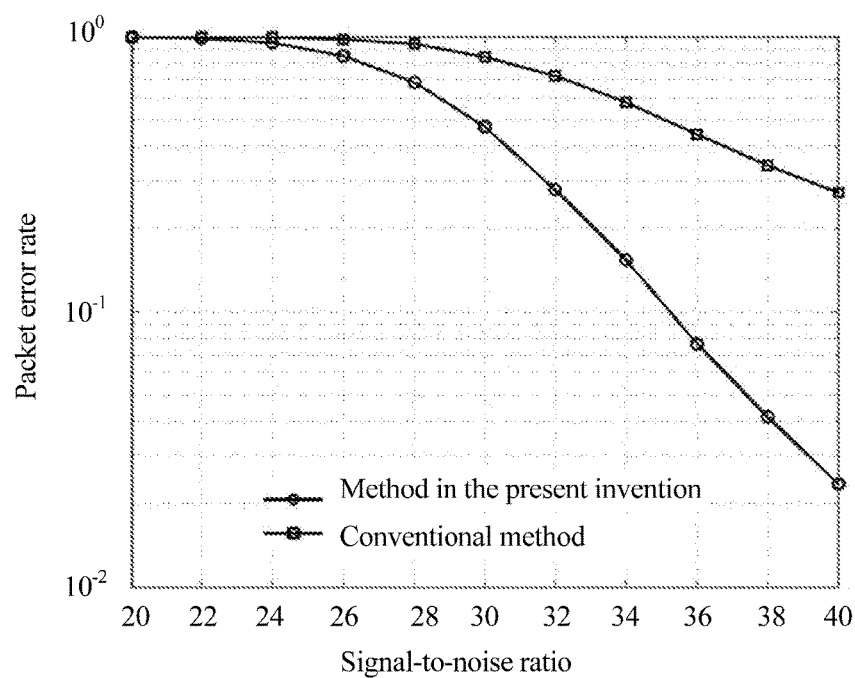
FIG. 10 is an analog simulation effect diagram of channel estimation that is performed by separately using a method in the prior art and using a method for transmitting uplink information in a MU-MIMO system according to an embodiment of the present invention.

FIG. 10 shows a packet error rate (Packet Error Rate, PER) obtained from channel estimation using a method provided in this embodiment of the present invention and a PER obtained from channel estimation using a method in the prior art. A P matrix that has undergone correction is used for channel estimation in the method in this embodiment of the present invention, and an original P matrix is used for channel estimation in the method in the prior art. It is assumed herein that each of a station 1 and a station 3 has a frequency offset whose value is +800 Hz relative to an AP, and each of a station 2 and a station 4 has a frequency offset whose value is −800 Hz relative to the AP. As shown in FIG. 10, the PER obtained from channel estimation using the method provided in this embodiment of the present invention is less than the obtained PER of using the method in the prior art. As a signal-to-noise ratio increases, a difference between the PER obtained in the method in this embodiment of the present invention and the PER obtained in the method in the prior art increases, which shows advantages and necessity of using the method in this embodiment of the present invention to perform channel estimation in a high signal-to-noise ratio environment.

It should be understood that the sequence numbers of the foregoing processes do not imply an execution order. The execution order of the processes is determined according to functions and internal logic of the processes, and the sequence numbers shall not constitute any limitation on an implementation process of the embodiments of the present invention.

With reference to FIG. 1 to FIG. 10, the foregoing details the method for transmitting uplink information in MU-MIMO according to the embodiments of the present invention. With reference to FIG. 11 to FIG. 14, the following describes a station and an access point according to embodiments of the present invention.

Figure 11:
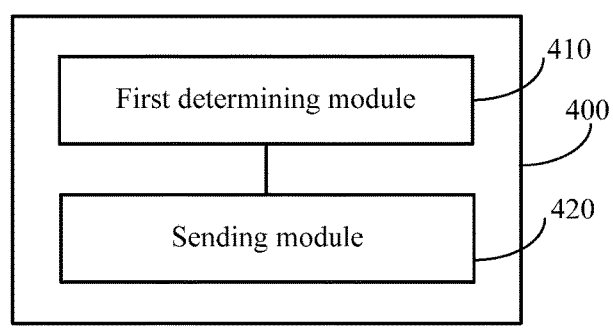
FIG. 11 is a schematic block diagram of a station in a MU-MIMO system according to an embodiment of the present invention.

FIG. 11 schematically shows a station 400 in a MU-MIMO system according to an embodiment of the present invention. In an optional embodiment, the station 400 may be a terminal device, but this embodiment of the present invention is not limited thereto. As shown in FIG. 11, the station 400 includes:

a first determining module 410, configured to determine multiple to-be-sent first LTFs, where the multiple first LTFs include at least one pilot for phase tracking; and a sending module 420, configured to send, to an access point on multiple symbols, the multiple first LTFs determined by the determining module 410, where a second station sends multiple second LTFs to the access point on the multiple symbols, the multiple second LTFs include at least one pilot for phase tracking, and a first pilot for phase tracking and a second pilot for phase tracking occupy different time-frequency resources, where the at least one pilot for phase tracking included in the multiple first LTFs includes the first pilot for phase tracking, and the at least one pilot for phase tracking included in the multiple second LTFs includes the second pilot for phase tracking.

Therefore, according to the station in this embodiment of the present invention, multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset parameter of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

Optionally, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, the station 400 further includes:

a second determining module, configured to determine pilot configuration information of the multiple first LTFs before the first determining module 410 determines the multiple to-be-sent first LTFs, where the pilot configuration information of the multiple first LTFs includes at least one of the following: at least one first LTF in the multiple first LTFs that includes a pilot for phase tracking, or a subcarrier that is occupied by the pilot for phase tracking included in the at least one first LTF.

Correspondingly, the first determining module 410 is specifically configured to determine the multiple to-be-sent first LTFs according to the pilot configuration information of the multiple first LTFs that is determined by the second determining module.

Optionally, in another embodiment, the sending module 420 is further configured to send a data transmission request to the access point before the second determining module determines the pilot configuration information of the multiple first LTFs.

In this case, the station 400 further includes:

a receiving module, configured to receive scheduling indication information that is sent by the access point according to the data transmission request sent by the sending module 420, where the scheduling indication information is used to indicate the pilot configuration information of the multiple first LTFs.

Correspondingly, the second determining module is specifically configured to determine the pilot configuration information of the multiple first LTFs according to the scheduling indication information received by the receiving module.

Optionally, in another embodiment, the scheduling indication information received by the receiving module is specifically used to instruct the first station to use a first pilot resource pattern in multiple preset pilot configuration patterns.

Optionally, in another embodiment, each first LTF of the multiple first LTFs further includes a pilot for channel estimation.

In this case, the station 400 further includes:

a processing module, configured to perform mapping matrix multiplication processing on only the pilot for channel estimation s in the multiple first LTFs before the sending module 420 sends the multiple first LTFs to the access point on the multiple symbols, to obtain the multiple processed first LTFs.

Correspondingly, the sending module 420 is specifically configured to send, to the access point on the multiple symbols, the multiple processed first LTFs obtained by the processing module.

The station 400 in this embodiment of the present invention may be corresponding to the first station in the method for transmitting uplink information in a MU-MIMO system in the embodiments of the present invention, and the foregoing and other operations and/or functions of the modules in the station 400 are separately used to implement corresponding processes of the methods in FIG. 2 to FIG. 6. For brevity, details are not described herein again.

Therefore, according to the station in this embodiment of the present invention, multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

Figure 12:
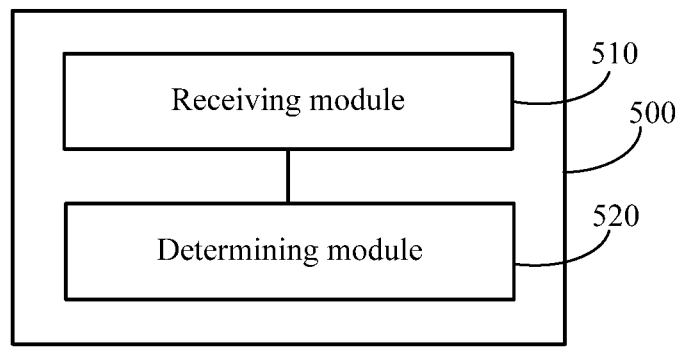
FIG. 12 is a schematic block diagram of an access point in a MU-MIMO system according to an embodiment of the present invention.

FIG. 12 schematically shows an access point 500 in a MU-MIMO system according to an embodiment of the present invention. The access point 500 includes:

a receiving module 510, configured to receive LTFs that are separately sent by Q stations on each symbol of multiple symbols, where multiple LTFs that are sent by each station of the Q stations on the multiple symbols include at least one pilot for phase tracking, and a first pilot for phase tracking and a second pilot for phase tracking occupy different time-frequency resources, where multiple LTFs sent by a first station include the first pilot for phase tracking, multiple LTFs sent by a second station include the second pilot for phase tracking, the Q stations include the first station and the second station, and Q>1; and a determining module 520, configured to determine a frequency offset parameter of each station of the Q stations according to pilot for phase tracking s included in multiple LTFs that are sent by the Q stations and received by the receiving module 510, where the frequency offset parameter of each station is used to represent a frequency offset of each station.

Therefore, the access point in this embodiment of the present invention receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset parameter of each station of the multiple stations according to the received pilot for phase tracking s separately sent by the multiple stations, and then takes a frequency offset of each station of the multiple stations into consideration when performing channel estimation. This can improve channel estimation accuracy and improve system performance.

Optionally, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, a pilot for phase tracking included in a first LTF sent by each station of the Q stations skips undergoing mapping matrix multiplication processing, and the multiple LTFs sent by each station include the first LTF.

Optionally, in another embodiment, the determining module 520 includes:

a first determining unit, configured to determine a third pilot for phase tracking received by the receiving module 510, where the third pilot for phase tracking occupies a first subcarrier, multiple LTFs sent by a third station include the third pilot for phase tracking, and the Q stations include the third station;

a second determining unit, configured to determine information about a channel between the access point and the third station on the first subcarrier according to the third pilot for phase tracking that is received by the receiving module and determined by the first determining unit; and a third determining unit, configured to determine a frequency offset parameter of the third station on the first subcarrier according to the information that is about the channel between the access point and the third station on the first subcarrier and that is determined by the second determining unit.

Optionally, in another embodiment, the frequency offset parameter of the third station on the first subcarrier includes: an amount by which a phase rotation of the third station on the first subcarrier changes with time.

Correspondingly, the third determining unit is specifically configured to:

determine a fourth pilot for phase tracking that is received by the receiving module 510 and that occupies the first subcarrier, where the multiple LTFs sent by the third station include the fourth pilot for phase tracking, and the third pilot for phase tracking and the fourth pilot for phase tracking occupy different symbols; and determine, according to the fourth pilot for phase tracking received by the receiving module 510 and the information that is about the channel between the access point and the third station on the first subcarrier and that is determined by the second determining unit, the amount by which the phase rotation of the third station on the first subcarrier changes with time.

Optionally, in another embodiment, the third determining unit is specifically configured to determine, the amount $e^{j\Delta\theta_{ji,q,n}}$ by which the phase rotation of the third station on the first subcarrier changes with time, according to the following formula:

$$e^{j\Delta\theta_{ji,p,q,n}} = Y_{j,p,q,n} / (\tilde{h}_{i,p,q,n} \times x_{j,q,n}) \quad (11)$$

where $Y_{j,p,q,n}$ represents the fourth pilot for phase tracking received by the $p^{th}$ antenna of the access point, $x_{j,q,n}$ represents the fourth pilot for phase tracking sent by the third station, and $\tilde{h}_{i,p,q,n}$ represents information about a channel between the access point and the third station on the first subcarrier.

Optionally, in another embodiment, the frequency offset parameter of the third station on the first subcarrier includes a frequency offset value of the third station on the first subcarrier.

In this case, the receiving module 510 is further configured to receive at least one data stream that is sent by each station of the Q stations on a first symbol, where the at least one data stream sent by each station includes a fifth pilot for phase tracking that occupies the first subcarrier.

The first determining unit is further configured to determine superposition information that is of the fifth phase pilots respectively corresponding to the Q stations and that is received by receiving module 510 on the first subcarrier.

The third determining unit is specifically configured to determine the frequency offset value of the third station on the first subcarrier according to the information that is about the channel between the access point and the third station on the first subcarrier and that is determined by the second determining unit and the superposition information that is received by the receiving module and determined by the first determining unit.

Optionally, in another embodiment, the first determining unit is further configured to determine a sixth pilot for phase tracking that is sent by each other station of at least one other station and received by the receiving module 510, where multiple LTFs sent by each other station include the sixth pilot for phase tracking, the sixth pilot for phase tracking occupies the first subcarrier, and the at least one other station is a station in the Q stations except the third station.

The second determining unit is further configured to determine information about a channel between each other station and the access point on the first subcarrier according to the received sixth pilot for phase tracking that is sent by each other station and determined by the first determining unit.

The third determining unit is specifically configured to determine the frequency offset value of the third station on the first subcarrier according to the information that is about the channel between the access point and each station of the Q stations on the first subcarrier and that is determined by the second determining unit and the superposition information that is received by the receiving module 510 and determined by the first determining unit.

Optionally, in another embodiment, the third determining unit is further configured to determine a frequency offset value of each other station of the at least one other station on the first subcarrier according to the information that is about the channel between the access point and each station of the Q stations on the first subcarrier and that is determined by the second determining unit and the superposition information that is received by the receiving module and determined by the first determining unit.

Optionally, in another embodiment, the third determining unit is specifically configured to determine the frequency offset value $v_q$ of the third station on the first subcarrier according to the following formula:

$$Y'_{p,n,g} = \sum_{q=1}^{Q} \tilde{h}_{p,q,n,g} x'_{q,n,g} e^{j2\pi N_B (S'_{tot}+g-q)v_q/N} \quad (12)$$

where $N_B = N + N_{CP}$, N represents a total quantity of subbands of a system, $N_{CP}$ represents a length of a cyclic prefix, the first symbol is the $g^{th}$ symbol of symbols used to bear data, $S'_{tot}$ represents a total quantity of data streams to be simultaneously sent by the Q stations to the access point, $Y'_{p,n,g}$ represents the superposition information received by the access point by using the $p^{th}$ antenna, $\tilde{h}_{p,q,n,g}$ represents information about a channel between the access point and a station numbered q among the Q stations on the first subcarrier, and $x'_{q,n,g}$ represents the fifth pilot for phase tracking corresponding to the station numbered q.

Optionally, in another embodiment, the third determining unit is further configured to determine a frequency offset parameter of the third station on a second subcarrier.

The determining module 520 further includes: a processing unit, configured to average the frequency offset parameter of the third station on the first subcarrier and the frequency offset parameter of the third station on the second subcarrier that are determined by the third determining unit, to obtain an average frequency offset parameter of the third station.

Optionally, in another embodiment, the access point 500 further includes:

a processing module, configured to perform correction processing on a mapping matrix according to the frequency offset parameter that is of each station of the Q stations and that is determined by the determining module 520; and a channel estimation module, configured to perform, according to the mapping matrix that has undergone the correction processing and that is obtained by the processing module, channel estimation on a channel occupied by multiple data streams that are sent by the Q stations on the first symbol.

Optionally, in another embodiment, the receiving module 510 is further configured to: before receiving the LTFs that are separately sent by the Q stations on each symbol of the multiple symbols, receive a data transmission request sent by each station of the Q stations.

In this case, the access point 500 may further include: a sending module, configured to send scheduling indication information to each station of the Q stations according to the data transmission request that is sent by each of the Q stations and received by the receiving module 510, where the scheduling indication information sent to each station is used to indicate pilot configuration information of the multiple LTFs to be sent by each station.

Correspondingly, the receiving module 510 is specifically configured to receive the LTFs that are separately sent by the Q stations on each symbol of the multiple symbols according to the scheduling indication information sent by the sending module.

The access point 500 in this embodiment of the present invention may be corresponding to the access point in the method for transmitting uplink information in a MU-MIMO system in the embodiments of the present invention, and the foregoing and other operations and/or functions of the modules in the access point 500 are separately used to implement corresponding processes of the methods in FIG. 7 to FIG. 9. For brevity, details are not described herein again.

Therefore, the access point in this embodiment of the present invention receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset of each station of the multiple stations according to the received pilot for phase tracking s separately sent by the multiple stations, and then takes a frequency offset of each station of the multiple stations into consideration when performing channel estimation. This can improve channel estimation accuracy and improve system performance.

Figure 13:
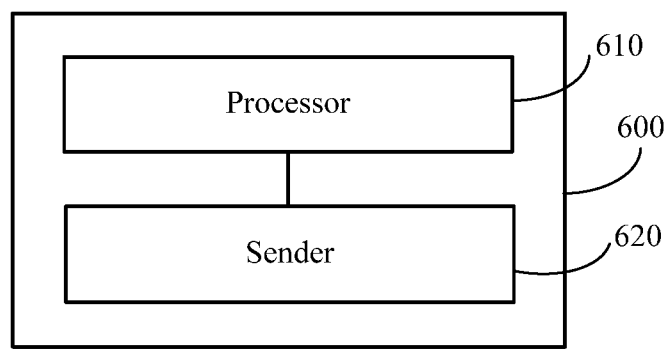
FIG. 13 is a schematic block diagram of a station in a MU-MIMO system according to another embodiment of the present invention.

FIG. 13 schematically shows a station 600 in a MU-MIMO system according to another embodiment of the present invention. In an optional embodiment, the station 600 may be a terminal device, but this embodiment of the present invention is not limited thereto. As shown in FIG. 13, the station 600 includes:

a processor 610, configured to determine multiple to-be-sent first LTFs, where the multiple first LTFs include at least one pilot for phase tracking; and a sender 620, configured to send, to an access point on multiple symbols, the multiple first LTFs determined by the processor 610, where a second station sends multiple second LTFs to the access point on the multiple symbols, the multiple second LTFs include at least one pilot for phase tracking, and a first pilot for phase tracking and a second pilot for phase tracking occupy different time-frequency resources, where the at least one pilot for phase tracking included in the multiple first LTFs includes the first pilot for phase tracking, and the at least one pilot for phase tracking included in the multiple second LTFs includes the second pilot for phase tracking.

Therefore, according to the station in this embodiment of the present invention, multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset parameter of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

It should be understood that in this embodiment of the present invention, the processor 610 may be a central processing unit (Central Processing Unit, "CPU" for short), or the processor 610 may be another general purpose processor, a digital signal processor (DSP), an application-specific integrated circuit (ASIC), a field programmable gate array (FPGA) or another programmable logic device, a discrete-gate or transistor logic device, a discrete hardware component, or the like. The general purpose processor may be a microprocessor, or the processor may be any conventional processor or the like.

The station may further include a memory. The memory may include a read-only memory and a random access memory, and provides an instruction and data to the processor 610. A part of the memory may further include a nonvolatile random access memory. For example, the memory may further store information about a device type.

In an implementation process, the steps of the foregoing method may be completed by using an integrated logic circuit of hardware or an instruction in a form of software in the processor 610. The steps of the method disclosed with reference to the embodiments of the present invention may be directly executed and completed by a hardware processor, or may be executed and completed by a combination of hardware and software modules in the processor. The software module may be located in any mature storage medium in the field such as a random access memory, a flash memory, a read-only memory, a programmable read-only memory, an electrically erasable programmable memory, or a register. The storage medium is located in the memory. The processor 610 reads information from the memory to complete the steps of the foregoing method in combination with the hardware of the processor. To avoid repetition, details are not described herein again.

Optionally, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, the processor 610 is further configured to determine pilot configuration information of the multiple first LTFs before determining the multiple to-be-sent first LTFs, where the pilot configuration information of the multiple first LTFs includes at least one of the following: at least one first LTF in the multiple first LTFs that includes a pilot for phase tracking, or a subcarrier that is occupied by the pilot for phase tracking included in the at least one first LTF; and determine the multiple to-be-sent first LTFs according to the pilot configuration information of the multiple first LTFs.

Optionally, in another embodiment, the sender 620 is further configured to send a data transmission request to the access point before the processor 610 determines the pilot configuration information of the multiple first LTFs.

In this case, the station 600 further includes:

a receiver, configured to receive scheduling indication information that is sent by the access point according to the data transmission request sent by the sender 620, where the scheduling indication information is used to indicate the pilot configuration information of the multiple first LTFs.

Correspondingly, the processor 610 is specifically configured to determine the pilot configuration information of the multiple first LTFs according to the scheduling indication information received by the receiver.

Optionally, in another embodiment, the scheduling indication information received by the receiver is specifically used to instruct the first station to use a first pilot resource pattern in multiple preset pilot configuration patterns.

Optionally, in another embodiment, each first LTF of the multiple first LTFs further includes a pilot for channel estimation.

In this case, the processor 610 is further configured to perform mapping matrix multiplication processing on only the pilot for channel estimation s in the multiple first LTFs before the sender 620 sends the multiple first LTFs to the access point on the multiple symbols, to obtain the multiple processed first LTFs.

Correspondingly, the sender 620 is specifically configured to send, to the access point on the multiple symbols, the multiple processed first LTFs obtained by the processing module.

The station 600 in this embodiment of the present invention may be corresponding to the first station in the method for transmitting uplink information in a MU-MIMO system in the embodiments of the present invention, and the foregoing and other operations and/or functions of the modules in the station 600 are separately used to implement corresponding processes of the methods in FIG. 2 to FIG. 6. For brevity, details are not described herein again.

Therefore, according to the station in this embodiment of the present invention, multiple stations send multiple LTFs to an AP on same multiple symbols. At least one LTF of multiple LTFs sent by each station of the multiple stations includes a pilot for phase tracking, and pilot for phase tracking s sent by the multiple stations separately occupy different time-frequency resources. In this case, the AP can determine a frequency offset parameter of each station of the multiple stations according to the pilot for phase tracking s that are separately sent by the multiple stations and received by the AP, and then take a frequency offset of each station of the multiple stations into consideration when performing channel estimation. This can improve channel estimation accuracy and improve system performance.

Figure 14:
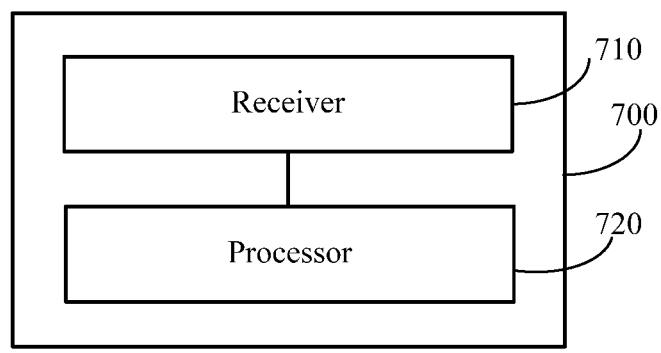
FIG. 14 is a schematic block diagram of an access point in a MU-MIMO system according to another embodiment of the present invention.

FIG. 14 schematically shows an access point 700 in a MU-MIMO system according to an embodiment of the present invention. The access point 700 includes:

a receiver 710, configured to receive LTFs that are separately sent by Q stations on each symbol of multiple symbols, where multiple LTFs that are sent by each station of the Q stations on the multiple symbols include at least one pilot for phase tracking, and a first pilot for phase tracking and a second pilot for phase tracking occupy different time-frequency resources, where multiple LTFs sent by a first station include the first pilot for phase tracking, multiple LTFs sent by a second station include the second pilot for phase tracking, the Q stations include the first station and the second station, and Q>1; and a processor 720, configured to determine a frequency offset parameter of each station of the Q stations according to pilot for phase tracking s included in multiple LTFs that are sent by the Q stations and received by the receiver 710, where the frequency offset parameter of each station is used to represent a frequency offset of each station.

Therefore, the access point in this embodiment of the present invention receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset of each station of the multiple stations according to the received pilot for phase tracking s separately sent by the multiple stations, and then takes a frequency offset of each station of the multiple stations into consideration when performing channel estimation. This can improve channel estimation accuracy and improve system performance.

It should be understood that in this embodiment of the present invention, the processor 720 may be a central processing unit (Central Processing Unit, "CPU" for short), or the processor 720 may be another general purpose processor, a digital signal processor (DSP), an application-specific integrated circuit (ASIC), a field programmable gate array (FPGA) or another programmable logic device, a discrete-gate or transistor logic device, a discrete hardware component, or the like. The general purpose processor may be a microprocessor, or the processor may be any conventional processor or the like.

The access point 700 may further include a memory. The memory may include a read-only memory and a random access memory, and provides an instruction and data to the processor 720. A part of the memory may further include a nonvolatile random access memory. For example, the memory may further store information about a device type.

In an implementation process, the steps of the foregoing method may be completed by using an integrated logic circuit of hardware or an instruction in a form of software in the processor 720. The steps of the method disclosed with reference to the embodiments of the present invention may be directly executed and completed by a hardware processor, or may be executed and completed by a combination of hardware and software modules in the processor. The software module may be located in any mature storage medium in the field such as a random access memory, a flash memory, a read-only memory, a programmable read-only memory, an electrically erasable programmable memory, or a register. The storage medium is located in the memory. The processor 720 reads information from the memory to complete the steps of the foregoing method in combination with the hardware of the processor. To avoid repetition, details are not described herein again.

Optionally, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, a pilot for phase tracking included in a first LTF sent by each station of the Q stations skips undergoing mapping matrix multiplication processing, and the multiple LTFs sent by each station include the first LTF.

Optionally, in another embodiment, the processor 720 is specifically configured to:

determine a third pilot for phase tracking received by the receiver 710, where the third pilot for phase tracking occupies a first subcarrier, multiple LTFs sent by a third station include the third pilot for phase tracking, and the Q stations include the third station;

determine information about a channel between the access point and the third station on the first subcarrier according to the third pilot for phase tracking received by the receiver 710; and determine a frequency offset parameter of the third station on the first subcarrier according to the information about the channel between the access point and the third station on the first subcarrier.

Optionally, in another embodiment, the frequency offset parameter of the third station on the first subcarrier includes: an amount by which a phase rotation of the third station on the first subcarrier changes with time.

Correspondingly, the processor 720 is specifically configured to:

determine a fourth pilot for phase tracking that is received by the receiver 710 and that occupies the first subcarrier, where the multiple LTFs sent by the third station include the fourth pilot for phase tracking, and the third pilot for phase tracking and the fourth pilot for phase tracking occupy different symbols; and determine, according to the fourth pilot for phase tracking received by the receiver 710 and the information about the channel between the access point and the third station on the first subcarrier, the amount by which the phase rotation of the third station on the first subcarrier changes with time.

Optionally, in another embodiment, the processor 720 is specifically configured to determine the amount $e^{j\Delta\theta_{ji,q,n}}$ by which the phase rotation of the third station on the first subcarrier changes with time, according to the following formula:

$$e^{j\Delta\theta_{ji,p,q,n}} = Y_{j,p,q,n}/(\tilde{h}_{i,p,q,n} \times x_{j,q,n}) \quad (13)$$

where $Y_{j,p,q,n}$ represents the fourth pilot for phase tracking received by the $p^{th}$ antenna of the access point, $x_{j,q,n}$ represents the fourth pilot for phase tracking sent by the third station, and $\tilde{h}_{i,p,q,n}$ represents the information about the channel between the access point and the third station on the first subcarrier.

Optionally, in another embodiment, the frequency offset parameter of the third station on the first subcarrier includes a frequency offset value of the third station on the first subcarrier.

In this case, the receiver 710 is further configured to receive at least one data stream that is sent by each station of the Q stations on a first symbol, where the at least one data stream sent by each station includes a fifth pilot for phase tracking that occupies the first subcarrier.

The processor 720 is further configured to:

determine superposition information that is of the fifth phase pilots respectively corresponding to the Q stations and that is received by the receiver 710 on the first subcarrier; and determine the frequency offset value of the third station on the first subcarrier according to the information about the channel between the access point and the third station on the first subcarrier and the superposition information received by the receiver 710.

Optionally, in another embodiment, the processor 720 is further configured to:

determine a sixth pilot for phase tracking that is sent by each other station of at least one other station and received by the receiver 710, where multiple LTFs sent by each other station include the sixth pilot for phase tracking, the sixth pilot for phase tracking occupies the first subcarrier, and the at least one other station is a station in the Q stations except the third station;

determine information about a channel between each other station and the access point on the first subcarrier according to the received sixth pilot for phase tracking sent by each other station; and determine the frequency offset value of the third station on the first subcarrier according to the information about the channel between the access point and each station of the Q stations on the first subcarrier and the superposition information that is received by the receiver 710 and determined by the first determining unit.

Optionally, in another embodiment, the processor 720 is further configured to determine a frequency offset value of each other station of the at least one other station on the first subcarrier according to the information about the channel between the access point and each station of the Q stations on the first subcarrier and the superposition information received by the receiver 710.

Optionally, in another embodiment, the processor 720 is specifically configured to determine the frequency offset value $v_q$ of the third station on the first subcarrier according to the following formula:

$$Y'_{p,n,g} = \sum_{q=1}^{Q} \tilde{h}_{p,q,n,g} x'_{q,n,g} e^{j2\pi N_B(S'_{tot}+g-q)v_q/N} \quad (14)$$

where $N_B = N + N_{CP}$, N represents a total quantity of subbands of a system, $N_{CP}$ represents a length of a cyclic prefix, the first symbol is the $g^{th}$ symbol of symbols used to bear data, $S'_{tot}$ represents a total quantity of data streams to be simultaneously sent by the Q stations to the access point, $Y'_{p,n,g}$ represents the superposition information received by the access point by using the $p^{th}$ antenna, $\tilde{h}_{p,q,n,g}$ represents information about a channel between the access point and a station numbered q among the Q stations on the first subcarrier, and $x'_{q,n,g}$ represents the fifth pilot for phase tracking corresponding to the station numbered q.

Optionally, in another embodiment, the processor 720 is further configured to:

determine a frequency offset parameter of the third station on a second subcarrier; and average the frequency offset parameter of the third station on the first subcarrier and the frequency offset parameter of the third station on the second subcarrier, to obtain an average frequency offset parameter of the third station.

Optionally, in another embodiment, the processor 720 is further configured to:

perform correction processing on a mapping matrix according to the frequency offset parameter of each station of the Q stations; and perform, according to the mapping matrix that has undergone the correction processing, channel estimation on a channel occupied by multiple data streams that are sent by the Q stations on the first symbol.

Optionally, in another embodiment, the receiver 710 is further configured to: before receiving the LTFs that are separately sent by the Q stations on each symbol of the multiple symbols, receive a data transmission request sent by each station of the Q stations.

In this case, the access point 700 may further include: a sender, configured to send scheduling indication information to each station of the Q stations according to the data transmission request that is sent by each of the Q stations and received by the receiver 710, where the scheduling indication information sent to each station is used to indicate pilot configuration information of the multiple LTFs to be sent by each station.

Correspondingly, the receiver 710 is specifically configured to receive the LTFs that are separately sent by the Q stations on each symbol of the multiple symbols according to the scheduling indication information sent by the sender.

The access point 700 in this embodiment of the present invention may be corresponding to the access point in the method for transmitting uplink information in a MU-MIMO system in the embodiments of the present invention, and the foregoing and other operations and/or functions of the modules in the access point 700 are separately used to implement corresponding processes of the methods in FIG. 7 to FIG. 9. For brevity, details are not described herein again.

Therefore, the access point in this embodiment of the present invention receives multiple LTFs that are sent by multiple stations on same multiple symbols. At least one LTF of multiple LTFs sent by each station of the multiple stations includes a pilot for phase tracking, and pilot for phase tracking s sent by the multiple stations separately occupy different time-frequency resources. The AP determines a frequency offset parameter of each station of the multiple stations according to the received pilot for phase tracking s separately sent by the multiple stations, and then takes a frequency offset of each station of the multiple stations into consideration when performing channel estimation. This can improve channel estimation accuracy and improve system performance.

A person skilled in the art may understand that, for the foregoing implementation manners, reference may be made to the manners described in the following:

EXAMPLE 1

A method for transmitting uplink information in a MU-MIMO system includes:

determining, by a first station, multiple to-be-sent first long training sequences, where the multiple first long training sequences include a first pilot for phase tracking; and sending, by the first station, the multiple first long training sequences to an access point on multiple symbols, where a second station sends multiple second long training sequences to the access point on the multiple symbols, the multiple second long training sequences include a second pilot for phase tracking, and the first pilot for phase tracking and the second pilot for phase tracking occupy different time-frequency resources.

Optionally, any pilot for phase tracking included in the multiple first long training sequences and any pilot for phase tracking included in the multiple second long training sequences occupy different time-frequency resources. That is, the first pilot for phase tracking is any pilot for phase tracking included in the multiple first long training sequences, and the second pilot for phase tracking is any pilot for phase tracking included in the multiple second long training sequences.

Optionally, in another embodiment, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, before the determining, by a first station, multiple to-be-sent first long training sequences, the method further includes:

determining, by the first station, pilot configuration information of the multiple first long training sequences, where the pilot configuration information of the multiple first long training sequences includes at least one of the following: a first long training sequence in the multiple first long training sequences that includes the first pilot for phase tracking, or a subcarrier occupied by the first pilot for phase tracking.

Correspondingly, the determining, by a first station, multiple to-be-sent first long training sequences includes:

determining, by the first station, the multiple to-be-sent first long training sequences according to the pilot configuration information of the multiple first long training sequences.

Optionally, in another embodiment, before the determining, by the first station, pilot configuration information of the multiple first long training sequences, the method further includes:

sending, by the first station, a data transmission request to the access point; and receiving, by the first station, scheduling indication information that is sent by the access point according to the data transmission request, where the scheduling indication information is used to indicate the pilot configuration information of the multiple first long training sequences.

Correspondingly, the determining, by the first station, pilot configuration information of the multiple first long training sequences includes:

determining, by the first station, the pilot configuration information of the multiple first long training sequences according to the scheduling indication information.

Optionally, in another embodiment, the scheduling indication information is specifically used to instruct the first station to use a first pilot resource pattern in multiple preset pilot configuration patterns.

Optionally, in another embodiment, each first long training sequence of the multiple first long training sequences further includes a pilot for channel estimation. In this case, before the sending, by the first station, the multiple first long training sequences to an access point on multiple symbols, the method further includes: performing, by the first station, mapping matrix multiplication processing on only the pilot for channel estimation s in the multiple first long training sequences, to obtain the multiple processed first long training sequences.

Correspondingly, the sending, by the first station, the multiple first long training sequences to an access point on multiple symbols includes:

sending the multiple processed first long training sequences to the access point on the multiple symbols by the first station.

EXAMPLE 2

A method for transmitting uplink information in a multi-user multiple-input multiple-output system includes:

receiving, by an access point, multiple first long training sequences that are sent by a first station on multiple symbols and multiple second long training sequences that are sent by a second station on the multiple symbols, where the multiple first long training sequences include at least one pilot for phase tracking, the multiple second long training sequences include at least one pilot for phase tracking, and a first pilot for phase tracking included in the multiple first long training sequences and a second pilot for phase tracking included in the multiple second long training sequences occupy different time-frequency resources; and determining, by the access point, a frequency offset parameter of the first station and that of the second station according to the at least one pilot for phase tracking included in the multiple first long training sequences and the at least one pilot for phase tracking included in the multiple second long training sequences, where a frequency offset parameter of each station is used to represent a frequency offset of each station.

Optionally, the first pilot for phase tracking is any pilot for phase tracking included in the multiple first long training sequences, and the second pilot for phase tracking is any pilot for phase tracking included in the multiple second long training sequences.

Optionally, in another embodiment, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, a pilot for phase tracking included in a first LTF sent by each station of the Q stations skips undergoing mapping matrix multiplication processing.

Optionally, in another embodiment, the determining, by the access point, a frequency offset parameter of the first station and that of the second station according to the at least one pilot for phase tracking included in the multiple first long training sequences and the at least one pilot for phase tracking included in the multiple second long training sequences includes:

determining, the access point, a received third pilot for phase tracking, where the multiple first long training sequences include the third pilot for phase tracking, and the third pilot for phase tracking occupies a first subcarrier;

determining, by the access point, information about a channel between the access point and the first station on the first subcarrier according to the received third pilot for phase tracking; and determining, by the access point, a frequency offset parameter of the first station on the first subcarrier according to the information about the channel between the access point and the first station on the first subcarrier.

Optionally, in another embodiment, the frequency offset parameter of the first station on the first subcarrier includes: an amount by which a phase rotation of the first station on the first subcarrier changes with time. In this case, the determining, by the access point, a frequency offset parameter of the first station on the first subcarrier according to the information about the channel between the access point and the first station on the first subcarrier includes:

determining, by the access point, a received fourth pilot for phase tracking that occupies the first subcarrier, where the multiple first long training sequences include the fourth pilot for phase tracking, and the third pilot for phase tracking and the fourth pilot for phase tracking occupy different symbols; and determining, by the access point according to the received fourth pilot for phase tracking and the information about the channel between the access point and the first station on the first subcarrier, the amount by which the phase rotation of the first station on the first subcarrier changes with time.

Optionally, in another embodiment, the amount $e^{k\Delta\theta_{ji,q,n}}$ by which the phase rotation of the first station on the first subcarrier changes with time is determined by using the following formula:

$$e^{j\Delta\theta_{ji,p,q,n}} = Y_{j,p,q,n} / (\hat{h}_{i,p,q,n} \times x_{j,q,n}) \quad (15)$$

where $Y_{j,p,q,n}$ represents the fourth pilot for phase tracking received by the $p^{th}$ antenna of the access point, $x_{j,q,n}$ represents the fourth pilot for phase tracking sent by the first station, and $\hat{h}_{i,p,q,n}$ represents the information about the channel between the access point and the first station on the first subcarrier.

Optionally, in another embodiment, the frequency offset parameter of the first station on the first subcarrier includes a frequency offset value of the first station on the first subcarrier. In this case, the method further includes:

receiving, by the access point, at least one data stream that is separately sent by the first station and the second station on a first symbol, where the at least one data stream separately sent by the first station and the second station includes a fifth pilot for phase tracking that occupies the first subcarrier; and determining, by the access point, superposition information that is of the fifth pilot for phase tracking sent by the first station and the fifth phase pilot sent by the second station and that is received on the first subcarrier.

Correspondingly, the determining, by the access point, a frequency offset parameter of the first station on the first subcarrier according to the information about the channel between the access point and the first station on the first subcarrier includes:

determining, by the access point, the frequency offset value of the first station on the first subcarrier according to the information about the channel between the access point and the first station on the first subcarrier and the superposition information received by the access point.

Optionally, in another embodiment, the determining, by the access point, a frequency offset parameter of the first station and that of the second station according to the at least one pilot for phase tracking included in the multiple first long training sequences and the at least one pilot for phase tracking included in the multiple second long training sequences further includes:

determining, by the access point, a received sixth pilot for phase tracking that occupies the first subcarrier, where the multiple second long training sequences include the sixth pilot for phase tracking; and determining, by the access point, information about a channel between the second station and the access point on the first subcarrier according to the received sixth pilot for phase tracking.

Correspondingly, the determining, by the access point, the frequency offset value of the first station on the first subcarrier according to the information about the channel between the access point and the first station on the first subcarrier and the superposition information received by the access point includes:

determining, by the access point, the frequency offset value of the first station on the first subcarrier according to the information about the channel between the access point and each of the first station and the second station on the first subcarrier and the superposition information received by the access point.

Optionally, in another embodiment, the determining, by the access point, a frequency offset parameter of the first station and that of the second station according to the at least one pilot for phase tracking included in the multiple first long training sequences and the at least one pilot for phase tracking included in the multiple second long training sequences further includes:

determining, by the access point, a frequency offset value of the second station on the first subcarrier according to the information about the channel between the access point and each of the first station and the second station on the first subcarrier and the superposition information received by the access point.

Optionally, in an another embodiment, the frequency offset value $v_q$ of the first station on the first subcarrier is determined by using the following formula:

$$Y'_{p,n,g} = \sum_{q=1} \tilde{h}_{p,q,n,g} x'_{q,n,g} e^{j2\pi N_B(S'_{tot}+g-q)v_q/N} \quad (16)$$

where $N_B=N+N_{CP}$, N represents a total quantity of subbands of a system, $N_{CP}$ represents a length of a cyclic prefix, the first symbol is the $g^{th}$ symbol of symbols used to bear data, $S'_{tot}$ represents a total quantity of data streams simultaneously sent by the first station and the second station to the access point, $Y'_{p,n,g}$ represents the superposition information received by the access point by using the $p^{th}$ antenna, $\tilde{h}_{p,q,n,g}$ represents the information about the channel between the access point and the first station or the second station on the first subcarrier, and $x'_{q,n,g}$ represents the fifth pilot for phase tracking sent by the first station or the second station.

Optionally, in another embodiment, the determining, by the access point, a frequency offset parameter of the first station and that of the second station according to the at least one pilot for phase tracking included in the multiple first long training sequences and the at least one pilot for phase tracking included in the multiple second long training sequences further includes:

determining, by the access point, a frequency offset parameter of the first station on a second subcarrier; and averaging, by the access point, the frequency offset parameter of the first station on the first subcarrier and the frequency offset parameter of the first station on the second subcarrier, to obtain an average frequency offset parameter of the first station.

Optionally, in another embodiment, the method further includes:

performing, by the access point, correction processing on a mapping matrix according to the frequency offset parameter of the first station and that of the second station; and performing, by the access point according to the mapping matrix that has undergone the correction processing, channel estimation on a channel occupied by multiple data streams that are sent by the first station and the second station on the first symbol.

Optionally, in another embodiment, before the receiving multiple first long training sequences that are sent by a first station on multiple symbols and multiple second long training sequences that are sent by a second station on the multiple symbols, the method further includes:

receiving, by the access point, a data transmission request separately sent by the first station and the second station; and sending, by the access point, scheduling indication information to each of the first station and the second station according to the data transmission request separately sent by the first station and the second station, where the scheduling indication information sent to each station of the first station and the second station is used to indicate pilot configuration information of multiple long training sequences to be sent by each station.

Correspondingly, the receiving, by the access point, multiple first long training sequences that are sent by a first station on multiple symbols and multiple second long training sequences that are sent by a second station on the multiple symbols includes:

receiving, by the access point, the multiple first long training sequences that are sent by the first station on the multiple symbols according to the scheduling indication information and the second long training sequences that are sent by the second station on the multiple symbols according to the scheduling indication information.

EXAMPLE 3

A station in a MU-MIMO system includes:

a first determining module, configured to determine multiple to-be-sent first long training sequences, where the multiple first long training sequences include a first pilot for phase tracking; and a sending module, configured to send, to an access point on multiple symbols, the multiple first long training sequences determined by the first determining module, where a second station sends multiple second long training sequences to the access point on the multiple symbols, the multiple second long training sequences include a second pilot for phase tracking, and the first pilot for phase tracking and the second pilot for phase tracking occupy different time-frequency resources.

Optionally, the first pilot for phase tracking is any pilot for phase tracking included in the multiple first long training sequences, and the second pilot for phase tracking is any pilot for phase tracking included in the multiple second long training sequences.

Optionally, in another embodiment, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, the station further includes:

a second determining module, configured to determine pilot configuration information of the multiple first long training sequences before the first determining module determines the multiple to-be-sent first long training sequences, where the pilot configuration information of the multiple first long training sequences includes at least one of the following: a first long training sequence in the multiple first long training sequences that includes the first pilot for phase tracking, or a subcarrier occupied by the first pilot for phase tracking.

Correspondingly, the first determining module is specifically configured to determine the multiple to-be-sent first long training sequences according to the pilot configuration information of the multiple first long training sequences that is determined by the second determining module.

Optionally, in another embodiment, the sending module is further configured to send a data transmission request to the access point before the second determining module determines the pilot configuration information of the multiple first long training sequences.

In this case, the station further includes: a receiving module, configured to receive scheduling indication information that is sent by the access point according to the data transmission request, where the scheduling indication information is used to indicate the pilot configuration information of the multiple first long training sequences.

Correspondingly, the second determining module is specifically configured to determine the pilot configuration information of the multiple first long training sequences according to the scheduling indication information received by the receiving module.

Optionally, in another embodiment, the scheduling indication information is specifically used to instruct the first station to use a first pilot resource pattern in multiple preset pilot configuration patterns.

Optionally, in another embodiment, each first long training sequence of the multiple first long training sequences further includes a pilot for channel estimation. In this case, the station further includes: a processing module, configured to perform mapping matrix multiplication processing on only the pilot for channel estimation s in the multiple first long training sequences before the sending module sends the multiple first long training sequences to the access point on the multiple symbols, to obtain the multiple processed first long training sequences.

Correspondingly, the sending module is specifically configured to send, to the access point on the multiple symbols, the multiple first long training sequences resulting from the processing of the processing module.

EXAMPLE 4

An access point in a multi-user multiple-input multiple-output system includes:

a receiving module, configured to receive multiple first long training sequences that are sent by a first station on multiple symbols and multiple second long training sequences that are sent by a second station on the multiple symbols, where the multiple first long training sequences include at least one pilot for phase tracking, the multiple second long training sequences include at least one pilot for phase tracking, and a first pilot for phase tracking included in the multiple first long training sequences and a second pilot for phase tracking included in the multiple second long training sequences occupy different time-frequency resources; and a determining module, configured to determine a frequency offset parameter of the first station and that of the second station according to the at least one pilot for phase tracking included in the multiple first long training sequences received by the receiving module and the at least one pilot for phase tracking included in the multiple second long training sequences, where a frequency offset parameter of each station is used to represent a frequency offset of each station.

Optionally, the first pilot for phase tracking is any pilot for phase tracking included in the multiple first long training sequences, and the second pilot for phase tracking is any pilot for phase tracking included in the multiple second long training sequences.

Optionally, in another embodiment, that the first pilot for phase tracking and the second pilot for phase tracking occupy different time-frequency resources includes:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

Optionally, in another embodiment, a pilot for phase tracking included in a first LTF sent by each station of the Q stations skips undergoing mapping matrix multiplication processing.

Optionally, in another embodiment, the determining module includes:

a first determining unit, configured to determine a received third pilot for phase tracking, where the multiple first long training sequences include the third pilot for phase tracking, and the third pilot for phase tracking occupies a first subcarrier;

a second determining unit, configured to determine information about a channel between the access point and the first station on the first subcarrier according to the received third pilot for phase tracking determined by the first determining unit; and a third determining unit, configured to determine a frequency offset parameter of the first station on the first subcarrier according to the information that is about the channel between the access point and the first station on the first subcarrier and that is determined by the second determining unit.

Optionally, in another embodiment, the frequency offset parameter of the first station on the first subcarrier includes: an amount by which a phase rotation of the first station on the first subcarrier changes with time. In this case, the third determining unit is specifically configured to:

determine a received fourth pilot for phase tracking that occupies the first subcarrier, where the multiple first long training sequences include the fourth pilot for phase tracking, and the third pilot for phase tracking and the fourth pilot for phase tracking occupy different symbols; and determine, according to the received fourth pilot for phase tracking and the information that is about the channel between the access point and the first station on the first subcarrier and that is determined by the second determining unit, the amount by which the phase rotation of the first station on the first subcarrier changes with time.

Optionally, in another embodiment, the third determining unit is specifically configured to determine the amount $e^{j\Delta\theta_{ji,q,n}}$ by which the phase rotation of the first station on the first subcarrier changes with time, according to the following formula:

$$e^{j\Delta\theta_{ji,p,q,n}} = Y_{j,p,q,n} / (\hat{h}_{i,p,q,n} \times x_{j,q,n}) \qquad (17)$$

where $Y_{j,p,q,n}$ represents the fourth pilot for phase tracking received by the $p^{th}$ antenna of the access point, $x_{j,q,n}$ represents the fourth pilot for phase tracking sent by the first station, and $\hat{h}_{i,p,q,n}$ represents the information about the channel between the access point and the first station on the first subcarrier.

Optionally, in another embodiment, the frequency offset parameter of the first station on the first subcarrier includes a frequency offset value of the first station on the first subcarrier. In this case, the receiving module is further configured to receive at least one data stream that is separately sent by the first station and the second station on a first symbol, where the at least one data stream separately sent by the first station and the second station includes a fifth pilot for phase tracking that occupies the first subcarrier.

The first determining unit is further configured to determine superposition information that is of the fifth pilot for phase tracking sent by the first station and the fifth phase pilot sent by the second station and that is received by the receiving module on the first subcarrier.

The third determining unit is specifically configured to determine the frequency offset value of the first station on the first subcarrier according to the information that is about the channel between the access point and the first station on the first subcarrier and that is determined by the second determining unit and the received superposition information determined by the first determining unit.

Optionally, in another embodiment, the first determining unit is further configured to determine a received sixth pilot for phase tracking that occupies the first subcarrier, where the multiple second long training sequences include the sixth pilot for phase tracking.

The second determining unit is further configured to determine information about a channel between the second station and the access point on the first subcarrier according to the received sixth pilot for phase tracking determined by the first determining unit.

The third determining unit is specifically configured to determine the frequency offset value of the first station on the first subcarrier according to the information that is about the channel between the access point and each of the first station and the second station on the first subcarrier and that is determined by the second determining unit and the superposition information received by the receiving module.

Optionally, in another embodiment, the third determining unit is further configured to determine a frequency offset value of the second station on the first subcarrier according to the information about the channel between the access point and each of the first station and the second station on the first subcarrier and the superposition information received by the receiving module.

Optionally, in another embodiment, the third determining unit is specifically configured to determine the frequency offset value $v_q$ of the first station on the first subcarrier according to the following formula:

$$Y'_{p,n,g} = \sum_{q=1,2} \tilde{h}_{p,q,n,g} x'_{q,n,g} e^{j2\pi N_B(S'_{tot}+g-q)v_q/N} \quad (18)$$

where $N_B = N + N_{CP}$, N represents a total quantity of subbands of a system, $N_{CP}$ represents a length of a cyclic prefix, the first symbol is the $g^{th}$ symbol of symbols used to bear data, $S'_{tot}$ represents a total quantity of data streams simultaneously sent by the first station and the second station to the access point, $Y'_{p,n,g}$ represents the superposition information received by the access point by using the $p^{th}$ antenna, $\tilde{h}_{p,q,n,g}$ represents the information about the channel between the access point and the first station or the second station on the first subcarrier, and $x'_{q,n,g}$ represents the fifth pilot for phase tracking sent by the first station or the second station.

Optionally, in another embodiment, the third determining unit is further configured to:

determine a frequency offset parameter of the first station on a second subcarrier; and average the frequency offset parameter of the first station on the first subcarrier and the frequency offset parameter of the first station on the second subcarrier, to obtain an average frequency offset parameter of the first station.

Optionally, in another embodiment, the access point further includes:

a correction module, configured to perform correction processing on a mapping matrix according to the frequency offset parameter of the first station and that of the second station that are determined by the determining module; and a channel estimation module, configured to perform, according to the mapping matrix that has undergone the correction module performs the correction processing, channel estimation on a channel occupied by multiple data streams that are sent by the first station and the second station on the first symbol.

Optionally, in another embodiment, the receiving module is further configured to: before receiving the multiple first long training sequences that are sent by the first station on the multiple symbols and the multiple second long training sequences that are sent by the second station on the multiple symbols, receive a data transmission request separately sent by the first station and the second station.

Correspondingly, the access point further includes: a sending module, configured to send scheduling indication information to each of the first station and the second station according to the data transmission request that is separately sent by the first station and the second station and received by the receiving module, where the scheduling indication information sent to each station of the first station and the second station is used to indicate pilot configuration information of multiple long training sequences to be sent by each station.

In this case, the receiving module is specifically configured to receive the multiple first long training sequences that are sent by the first station on the multiple symbols according to the scheduling indication information sent by the sending module and the second long training sequences that are sent by the second station on the multiple symbols according to the scheduling indication information sent by the sending module.

It should be understood that the term "and/or" in the embodiments of the present invention describes only an association relationship between associated objects and indicates that three relationships may exist. For example, A and/or B may indicate the following three cases: Only A exists; both A and B exist; and only B exists. In addition, the character "/" in this specification generally indicates an "or" relationship between associated objects.

A person of ordinary skill in the art may be aware that, with reference to the embodiments disclosed in this specification, described steps and units in methods may be implemented by electronic hardware, computer software, or a combination thereof. To clearly describe the interchangeability between the hardware and the software, the foregoing has generally described steps and compositions of each embodiment according to functions. Whether these functions are performed in a hardware or software manner depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for convenience and brevity of description, for a detailed working process of the foregoing described system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the foregoing described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings, direct couplings, or communications connections may be indirect couplings or communications connections through some interfaces, apparatuses, or units, or may be electronic, mechanical, or other forms of connections.

The units described as separate parts may be or may be not physically separate, and parts displayed as units may be or may be not physical units, that is, may be located in one location, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of the present invention essentially, the part contributing to the prior art, or all or some of the technical solutions may be implemented in a form of a software product. The computer software product is stored in a storage medium and includes instructions for instructing a computer device (may be a personal computer, a server, or a network device) to perform all or some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but the protection scope of the present invention is not limited thereto. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for transmitting uplink information in a multi-user multiple-input multiple-output system, comprising:
   determining, by a first station, multiple to-be-sent first long training sequences, wherein the multiple first long training sequences comprise at least one pilot for phase tracking; and
   sending, by the first station, the multiple first long training sequences to an access point on multiple symbols, wherein a second station sends multiple second long training sequences to the access point on the multiple symbols, the multiple second long training sequences comprise at least one pilot for phase tracking, and a first pilot for phase tracking and a second pilot for phase tracking occupy different time-frequency resources, wherein the at least one pilot for phase tracking comprised in the multiple first long training sequences comprises the first pilot for phase tracking, and the at least one pilot for phase tracking comprised in the multiple second long training sequences comprises the second pilot for phase tracking.

2. The method according to claim 1, wherein that the first pilot for phase tracking and the second pilot for phase tracking occupy different time-frequency resources comprises:
   the first pilot for phase tracking and the second pilot for phase tracking occupy different symbols; or
   the first pilot for phase tracking and the second pilot for phase tracking occupy a same symbol, and the first pilot for phase tracking and the second pilot for phase tracking occupy different subcarriers.

3. The method according to claim 1, wherein before the determining, by a first station, multiple to-be-sent first long training sequences, the method further comprises:
   determining, by the first station, pilot configuration information of the multiple first long training sequences, wherein the pilot configuration information of the multiple first long training sequences comprises at least one of the following: at least one first long training sequence in the multiple first long training sequences that comprises a pilot for phase tracking, or a subcarrier that is occupied by the pilot for phase tracking comprised in the at least one first long training sequence; and
   the determining, by a first station, multiple to-be-sent first long training sequences comprises:
   determining, by the first station, the multiple to-be-sent first long training sequences according to the pilot configuration information of the multiple first long training sequences.

4. The method according to claim 3, wherein before the determining, by the first station, pilot configuration information of the multiple first long training sequences, the method further comprises:
   sending, by the first station, a data transmission request to the access point; and
   receiving, by the first station, scheduling indication information that is sent by the access point according to the data transmission request, wherein the scheduling indication information is used to indicate the pilot configuration information of the multiple first long training sequences; and
   the determining, by the first station, pilot configuration information of the multiple first long training sequences comprises:
   determining, by the first station, the pilot configuration information of the multiple first long training sequences according to the scheduling indication information.

5. The method according to claim 4, wherein the scheduling indication information is used to instruct the first station to use a first pilot resource pattern in multiple preset pilot configuration patterns.

6. The method according to claim 1, wherein each first long training sequence of the multiple first long training sequences further comprises a pilot for channel estimation;
   before the sending, by the first station, the multiple first long training sequences to an access point on multiple symbols, the method further comprises:

performing, by the first station, mapping matrix multiplication processing on only the pilot for channel estimation s in the multiple first long training sequences, to obtain the multiple processed first long training sequences; and the sending, by the first station, the multiple first long training sequences to an access point on multiple symbols comprises:

sending, by the first station, the multiple processed first long training sequences to the access point on the multiple symbols.

7. A method for transmitting uplink information in a multi-user multiple-input multiple-output system, comprising:

receiving, by an access point, long training sequences that are separately sent by Q stations on each symbol of multiple symbols, wherein multiple long training sequences that are sent by each station of the Q stations on the multiple symbols comprise a pilot for phase tracking, and a first pilot for phase tracking and a second pilot for phase tracking occupy different time-frequency resources, wherein multiple long training sequences sent by a first station comprise the first pilot for phase tracking, multiple long training sequences sent by a second station comprise the second pilot for phase tracking, the Q stations comprise the first station and the second station, and Q>1; and determining, by the access point, a frequency offset parameter of each station of the Q stations according to pilot for phase tracking s comprised in multiple long training sequences sent by the Q stations, wherein the frequency offset parameter of each station is used to represent a frequency offset of each station.

8. The method according to claim 7, wherein that the first pilot for phase tracking and the second pilot for phase tracking occupy different time-frequency resources comprises:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

9. The method according to claim 7, wherein a pilot for phase tracking comprised in a first long training sequence sent by each station of the Q stations skips undergoing mapping matrix multiplication processing, and the multiple long training sequences sent by each station comprise the first long training sequence.

10. The method according to claim 7, wherein the method further comprises:

performing, by the access point, correction processing on a mapping matrix according to the frequency offset parameter of each station of the Q stations; and performing, by the access point according to the mapping matrix that has undergone the correction processing, channel estimation on a channel occupied by multiple data streams that are sent by the Q stations on the first symbol.

11. A station in a multi-user multiple-input multiple-output system, comprising:

a first determining module, configured to determine multiple to-be-sent first long training sequences, wherein the multiple first long training sequences comprise at least one pilot for phase tracking; and a sending module, configured to send, to an access point on multiple symbols, the multiple first long training sequences determined by the determining module, wherein a second station sends multiple second long training sequences to the access point on the multiple symbols, the multiple second long training sequences comprise at least one pilot for phase tracking, and a first pilot for phase tracking and a second pilot for phase tracking occupy different time-frequency resources, wherein the at least one pilot for phase tracking comprised in the multiple first long training sequences comprises the first pilot for phase tracking, and the at least one pilot for phase tracking comprised in the multiple second long training sequences comprises the second pilot for phase tracking.

12. The station according to claim 11, wherein that the first pilot for phase tracking and the second pilot for phase tracking occupy different time-frequency resources comprises:

the first pilot for phase tracking and the second pilot for phase tracking occupy different symbols; or the first pilot for phase tracking and the second pilot for phase tracking occupy a same symbol, and the first pilot for phase tracking and the second pilot for phase tracking occupy different subcarriers.

13. The station according to claim 11, wherein the station further comprises:

a second determining module, configured to determine pilot configuration information of the multiple first long training sequences before the first determining module determines the multiple to-be-sent first long training sequences, wherein the pilot configuration information of the multiple first long training sequences comprises at least one of the following: at least one first long training sequence in the multiple first long training sequences that comprises a pilot for phase tracking, or a subcarrier that is occupied by the pilot for phase tracking comprised in the at least one first long training sequence, wherein the first determining module is configured to determine the multiple to-be-sent first long training sequences according to the pilot configuration information of the multiple first long training sequences that is determined by the second determining module.

14. The station according to claim 13, wherein the sending module is further configured to send a data transmission request to the access point before the second determining module determines the pilot configuration information of the multiple first long training sequences;

the station further comprises:

a receiving module, configured to receive scheduling indication information that is sent by the access point according to the data transmission request sent by the sending module, wherein the scheduling indication information is used to indicate the pilot configuration information of the multiple first long training sequences; and the second determining module is configured to determine the pilot configuration information of the multiple first long training sequences according to the scheduling indication information received by the receiving module.

15. The station according to claim 14, wherein the scheduling indication information received by the receiving module is used to instruct the first station to use a first pilot resource pattern in multiple preset pilot configuration patterns.

16. The station according to claim 11, wherein each first long training sequence of the multiple first long training sequences further comprises a pilot for channel estimation; the station further comprises:
- a processing module, configured to perform mapping matrix multiplication processing on only the pilot for channel estimation s in the multiple first long training sequences before the sending module sends the multiple first long training sequences to the access point on the multiple symbols, to obtain the multiple processed first long training sequences; and
- the sending module is configured to send, to the access point on the multiple symbols, the multiple processed first long training sequences obtained by the processing module.

17. An access point in a multi-user multiple-input multiple-output system, comprising:
- a receiving module, configured to receive long training sequences that are separately sent by Q stations on each symbol of multiple symbols, wherein multiple long training sequences that are sent by each station of the Q stations on the multiple symbols comprise at least one pilot for phase tracking, and a first pilot for phase tracking and a second pilot for phase tracking occupy different time-frequency resources, wherein multiple long training sequences sent by a first station comprise the first pilot for phase tracking, multiple long training sequences sent by a second station comprise the second pilot for phase tracking, the Q stations comprise the first station and the second station, and Q>1; and
- a determining module, configured to determine a frequency offset parameter of each station of the Q stations according to pilot for phase tracking s comprised in multiple long training sequences that are sent by the Q stations and received by the receiving module, wherein the frequency offset parameter of each station is used to represent a frequency offset of each station.

18. The access point according to claim 17, wherein that the first pilot for phase tracking and the second pilot for phase tracking occupy different time-frequency resources comprises:
- the first pilot for phase tracking and the second pilot for phase tracking occupy different symbols; or
- the first pilot for phase tracking and the second pilot for phase tracking occupy a same symbol, and the first pilot for phase tracking and the second pilot for phase tracking occupy different subcarriers.

19. The access point according to claim 17, wherein a pilot for phase tracking comprised in a first long training sequence sent by each station of the Q stations skips undergoing mapping matrix multiplication processing, and the multiple long training sequences sent by each station comprise the first long training sequence.

20. The access point according to claim 17, wherein the determining module comprises:
- a first determining unit, configured to determine a third pilot for phase tracking received by the receiving module, wherein the third pilot for phase tracking occupies a first subcarrier, multiple long training sequences sent by a third station comprise the third pilot for phase tracking, and the Q stations comprise the third station;
- a second determining unit, configured to determine information about a channel between the access point and the third station on the first subcarrier according to the third pilot for phase tracking that is received by the receiving module and determined by the first determining unit; and
- a third determining unit, configured to determine a frequency offset parameter of the third station on the first subcarrier according to the information that is about the channel between the access point and the third station on the first subcarrier and that is determined by the second determining unit.

* * * * *